(12) United States Patent
Watts et al.

(10) Patent No.: US 12,219,417 B1
(45) Date of Patent: Feb. 4, 2025

(54) TRANSMISSION HANDLING FOR PCI SATELLITE SWITCHING

(71) Applicant: InterDigital Patent Holdings, Inc., Wilmington, DE (US)

(72) Inventors: Dylan Watts, Montreal (CA); Paul Marinier, Brossard (CA); Moon Il Lee, Melville, NY (US); Brian Martin, Farnham (GB); Oumer Teyeb, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/760,104

(22) Filed: Jul. 1, 2024

Related U.S. Application Data

(63) Continuation of application No. PCT/US2024/022912, filed on Apr. 4, 2024.
(Continued)

(51) Int. Cl.
*H04W 36/08* (2009.01)
*H04W 24/02* (2009.01)
(Continued)

(52) U.S. Cl.
CPC .......... *H04W 36/08* (2013.01); *H04W 24/02* (2013.01); *H04W 56/0015* (2013.01); *H04W 84/06* (2013.01)

(58) Field of Classification Search
CPC . H04W 36/08; H04W 36/0088; H04W 84/06; H04W 24/02; H04W 56/0015
See application file for complete search history.

(56) References Cited

U.S. PATENT DOCUMENTS

| 2021/0068065 A1 | 3/2021 | Wigard et al. |
| 2022/0046504 A1* | 2/2022 | Shrestha ............ H04W 36/304 |

(Continued)

OTHER PUBLICATIONS

3GPP TS 38.300 V17.2.0, "Technical Specification Group Radio Access Network; NR", 3rd Generation Partnership Project; NR and NG-RAN Overall Description; Stage 2 (Release 17), Sep. 2022, 210 pages.

(Continued)

*Primary Examiner* — Wayne H Cai
(74) *Attorney, Agent, or Firm* — Flaster Greenberg, P.C.

(57) ABSTRACT

A wireless transmit/receive unit (WTRU) may comprise a processor. The processor may be configured to receive (e.g., via broadcast) configuration information indicating a time that a same-PCI satellite switch may occur. In one or more examples, the WTRU may transmit assistance information prior to the same-PCI satellite switch. The assistance information may, for example, include a re-synchronization duration, capabilities to synchronization procedures, and/or a time indication for resuming TX and/or RX. The WTRU may receive configuration information for satellite re-synchronization. The WTRU may perform the same-PCI satellite switch to the second satellite, for example, based on the configuration information indicating the time for the same-PCI satellite switch. In performing the same-PCI satellite switch, the WTRU may start a resynchronization gap, suspend UL TX and/or DL RX, and/or perform re-synchronization procedure(s).

16 Claims, 11 Drawing Sheets

Related U.S. Application Data

(60) Provisional application No. 63/456,866, filed on Apr. 4, 2023.

(51) Int. Cl.
*H04W 56/00* (2009.01)
*H04W 84/06* (2009.01)

(56) References Cited

U.S. PATENT DOCUMENTS

2024/0048227 A1* 2/2024 Leng .................. H04B 7/18513
2024/0179591 A1* 5/2024 Ji .......................... H04W 36/08

OTHER PUBLICATIONS

3GPP TS 38.321 V17.2.0 , "NR; Medium Access Control (MAC) Protocol Specification (Release 17)", 3rd Generation Partnership Project Technical Specification Group Radio Access Network, Sep. 2022, 246 pages.

3GPP TS 38.331 V17.2.0 , "NR; Radio Resource Control (RRC) Protocol Specification (Release 17)", 3rd Generation Partnership Project; Technical Specification Group Radio Access Network, Sep. 2022, 1298 pages.

Third Generation Partnership Project (3GPP), "On handover enhancement for signalling overhead reduction in NR NTN", Xiao Xiao et al: 3GPP Draft; Type Discussion, R2-2300346, Sophia-Antipolis Cedex, France, Feb. 27-Mar. 3, 2023, 13 pages.

Third Generation Partnership Project (3GPP), "Discussion on Handover enhancements for NTN", Type Discussion; NR NTN ENH-CORE, R2-2301504, Sophia-Antipolis Cedexfrance vol. 3GPP RAN 2, No. Athens, GR; Feb. 27, 2023-Mar. 3, 2023, Feb. 27-Mar. 3, 2023, 3 pages.

* cited by examiner

TRANSMISSION HANDLING FOR PCI SATELLITE SWITCHING

CROSS-REFERENCE TO RELATED APPLICATIONS

This application is a continuation of International Application No. PCT/US2024/22912, filed Apr. 4, 2024, which claims priority to U.S. Provisional Patent Application No. 63/456,866 filed on Apr. 4, 2023, the entire contents of which are incorporated herein by reference.

BACKGROUND

A WTRU may be configured for use in non-terrestrial networks (NTN). Non-terrestrial networks (NTN) may facilitate deployment of wireless networks in areas where land-based antennas may be impractical and/or undesirable. For example, land-based antennas may be impractical due to geography and/or cost. Coupled with terrestrial networks, NTNs may provide ubiquitous 5G network coverage. Some example NTN deployments may support basic talk and text around the world. NTN deployments, coupled with proliferation of next-generation low-orbit satellites, may enable further services (e.g., web browsing).

An NTN may include an aerial, or space-borne, platform which, via a gateway (GW), may transport signals from a land-based gNB to a WTRU and vice-versa. Example NTN deployments may support a power class 3 WTRU with an omnidirectional antenna and linear polarization, or a small aperture antenna (VSAT) terminal with directive antenna and circular polarization. Example NTNs may provide support for LTE-based narrow-band IoT (NB-IoT) and eMTC type devices. In examples, regardless of device type, NTN WTRUs may be GNSS capable.

SUMMARY

A wireless transmit/receive unit (WTRU) may comprise a processor configured to receive configuration information indicating a time for a same-physical cell identity (PCI) satellite switch from a first satellite to a second satellite. The configuration information may comprise a start time and an indication of an end time for the same-PCI satellite switch from the first satellite to the second satellite. The processor may be further configured to receive a configuration for satellite re-synchronization with the second satellite. The processor may be further configured to perform the same-PCI satellite switch to the second satellite based on the configuration information indicating the time for the same-PCI satellite switch.

The configuration information may be received via broadcast signaling. The processor may be further configured to start a resynchronization gap in response to the same-PCI satellite switch. The processor may be further configured to suspend uplink transmission with the first satellite in response to the same-PCI satellite switch. The processor may be further configured to perform one or more re-synchronization procedures in response to the same-PCI satellite switch. The processor may be further configured to transmit a resynchronization successful indication in response to successful re-synchronization to the second satellite.

The one or more re-synchronization procedures may comprise a timing advance calculation, a doppler compensation, a power control procedure, and/or a measurement procedure. In response to the same-PCI satellite switch, the processor may be further configured to start a resynchronization gap, suspend uplink transmission and downlink reception, and perform one or more re-synchronization procedures. The re-synchronization procedures may comprise a timing advance calculation, a doppler compensation, a power control procedure, and/or a measurement procedure. The configuration for satellite re-synchronization may comprise a resynchronization gap configuration, a condition to declare resynchronization failure, and/or resources to indicate successful re-synchronization to the second satellite.

The processor may be further configured to transmit assistance information that relates to a resync time, to assist measurement gap configuration. The assistance information may comprise a re-synchronization duration, an indication that the WTRU can perform a synchronization procedure prior to the same-PCI satellite switch, and/or an indication of a time that the WTRU can resume communication with the second satellite after the same-PCI satellite switch.

DETAILED DESCRIPTION

Figure 1A:
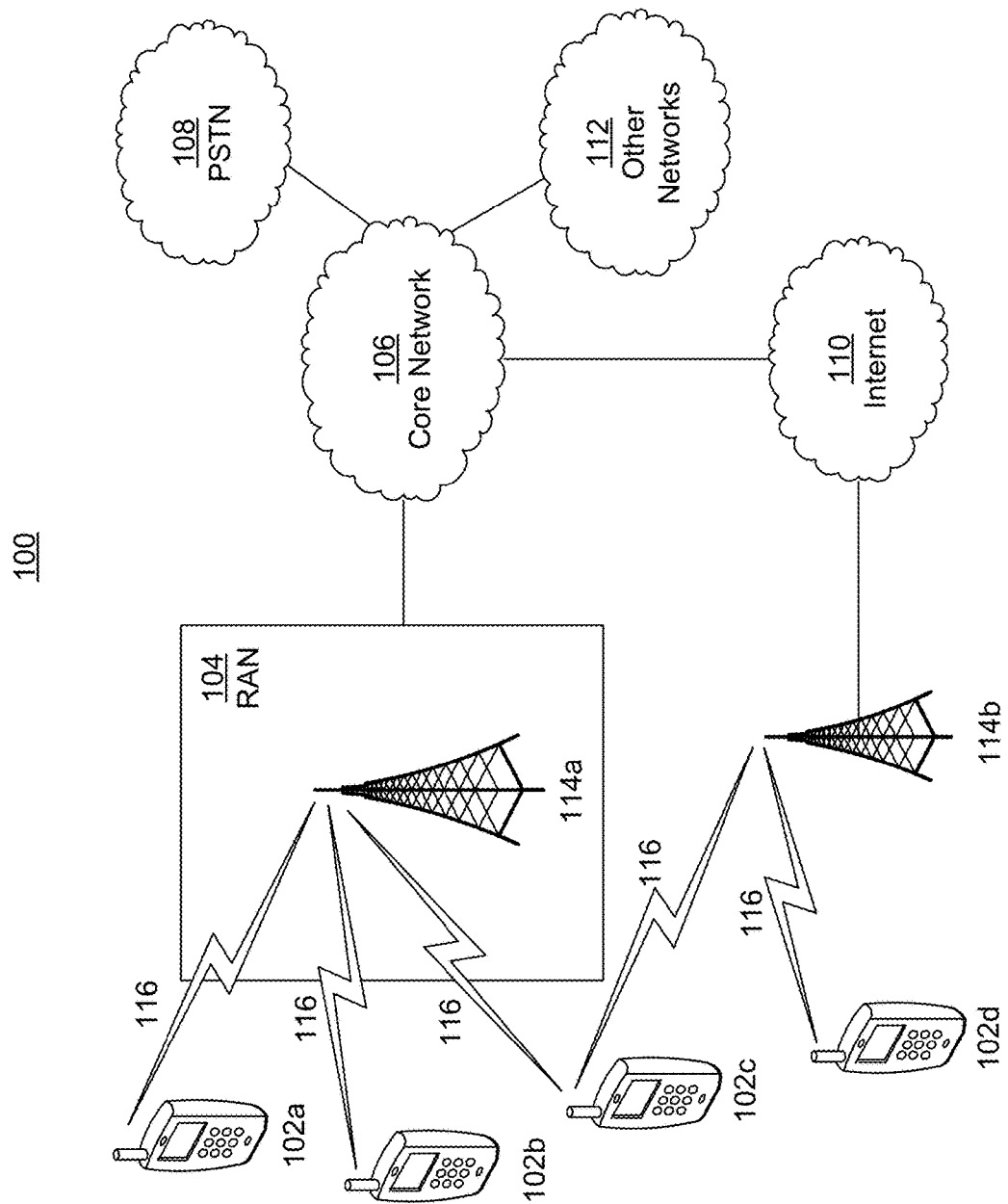
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU. Further, any description herein that is described with reference to a UE may be equally applicable to a WTRU (or vice versa). For example, a WTRU may be configured to perform any of the processes or procedures described herein as being performed by a UE (or vice versa).

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN).

In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
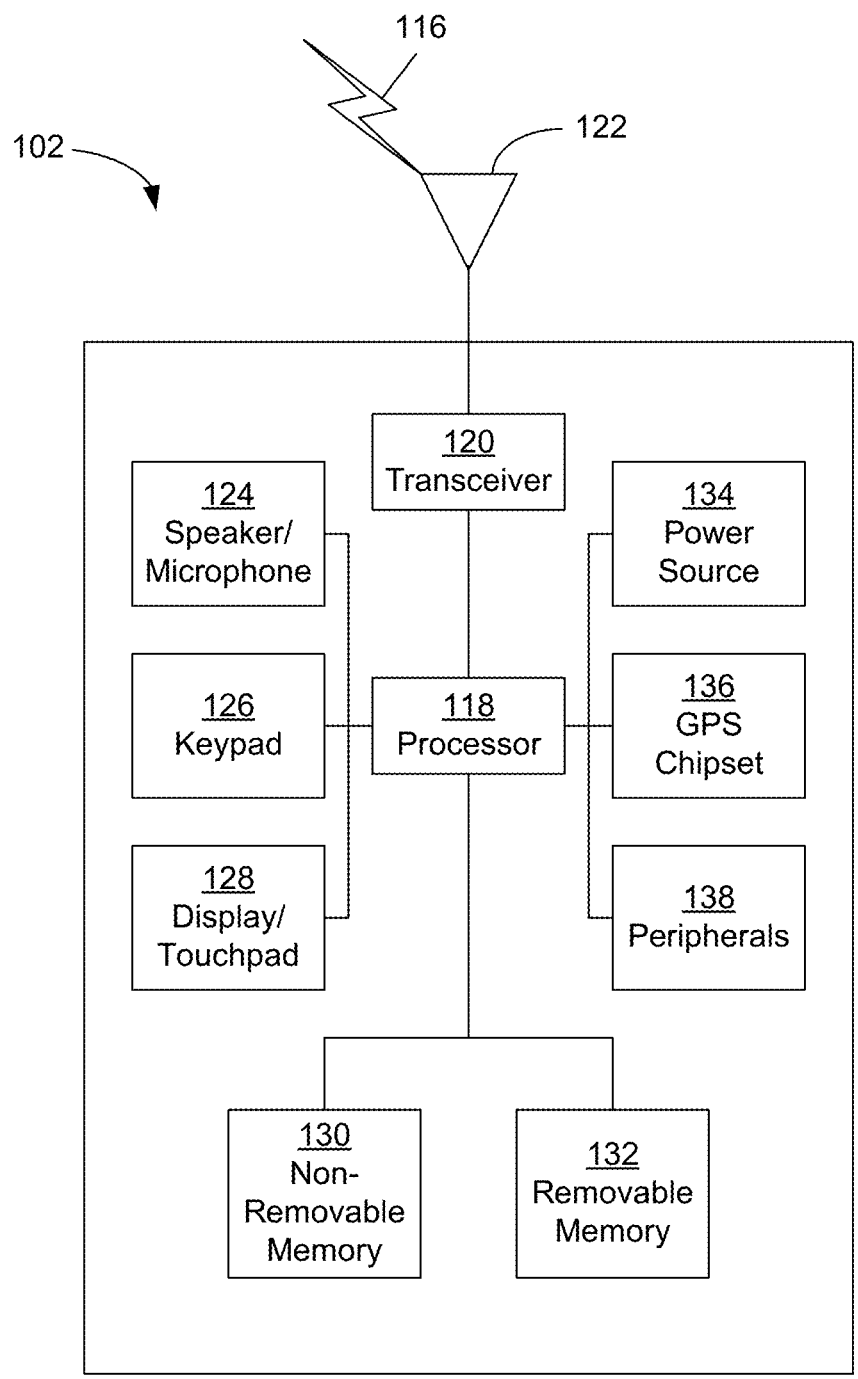
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
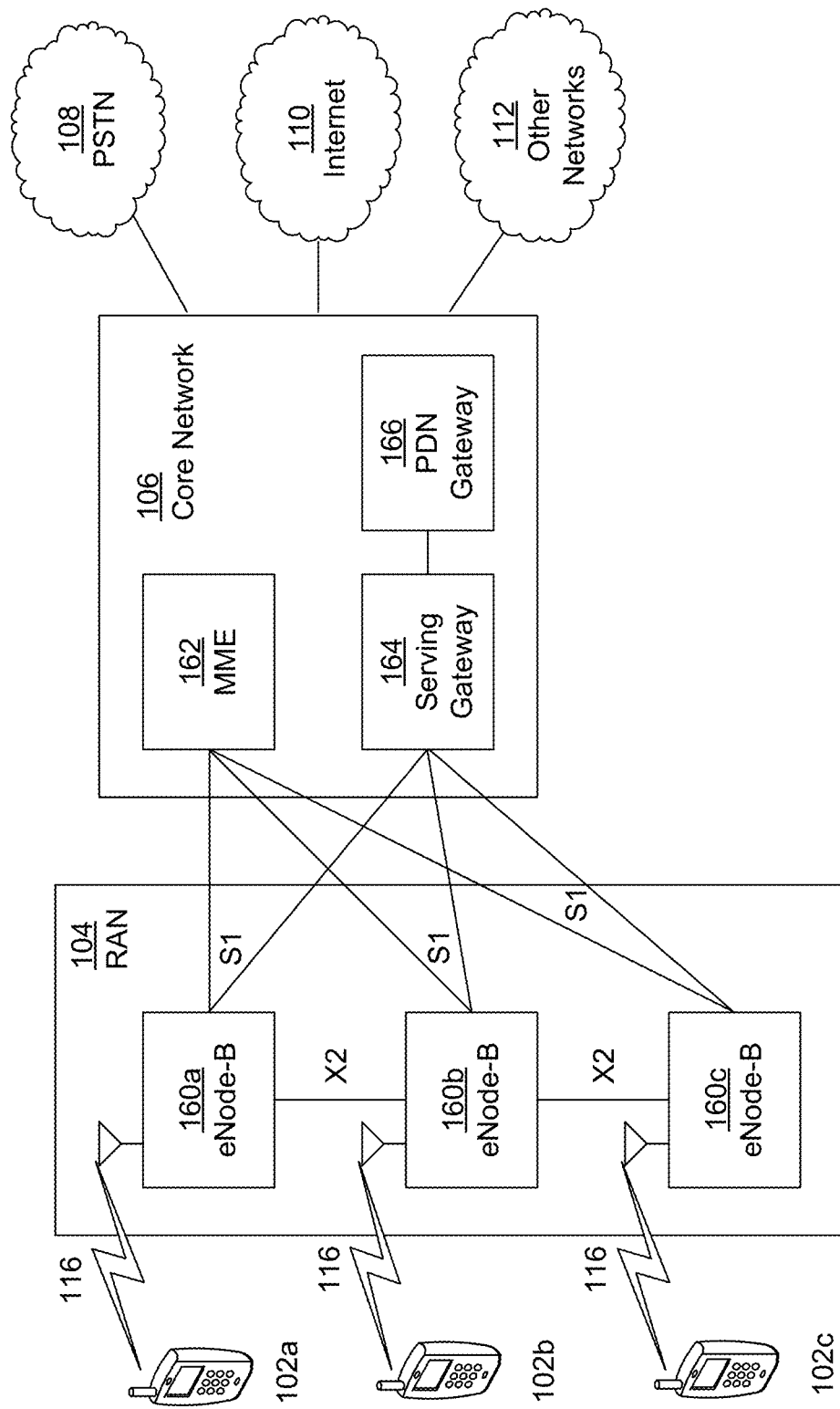
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
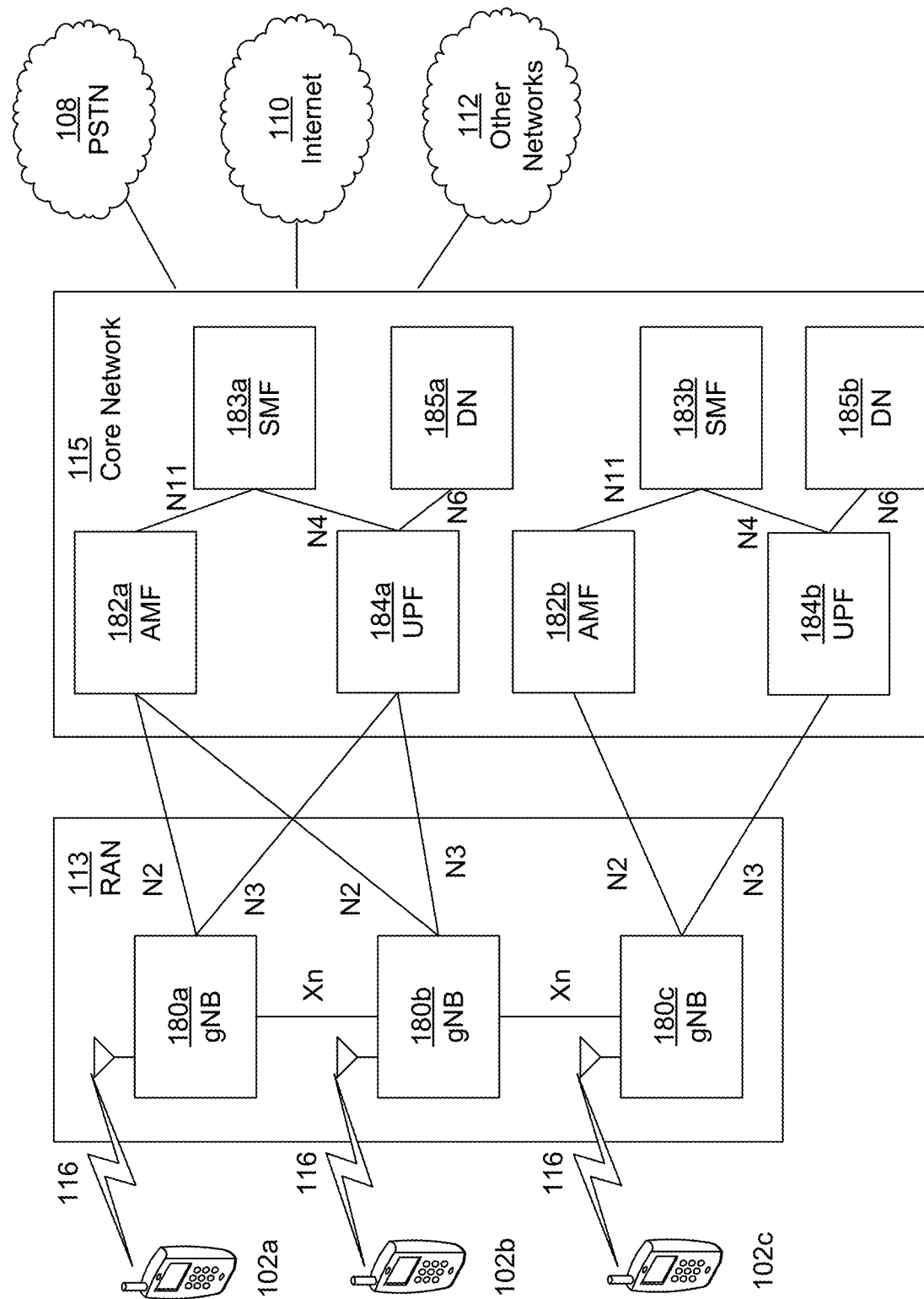
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following abbreviations and acronyms, among others, are used herein: Acknowledgement (ACK); Block Error Rate (BLER); Bandwidth Part (BWP); Channel Access Priority (CAP); Channel access priority class (CAPC); Clear Channel Assessment (CCA); Control Channel Element (CCE); Control Element (CE); Configured grant or cell group (CG); Cyclic Prefix (CP); Conventional OFDM (relying on cyclic prefix) (CP-OFDM); Channel Quality Indicator (CQI); Cyclic Redundancy Check (CRC); Channel State Information (CSI); Contention Window (CW); Contention Window Size (CWS); Channel Occupancy (CO); Downlink Assignment Index (DAI); Downlink Control Information (DCI); Downlink feedback information (DFI); Dynamic grant (DG); Downlink (DL); Demodulation Reference Signal (DM-RS); Data Radio Bearer (DRB); enhanced Licensed Assisted Access (eLAA); Further enhanced Licensed Assisted Access (FeLAA); Hybrid Automatic Repeat Request (HARQ); License Assisted Access (LAA); Listen-Before-Talk (LBT); Long Term Evolution (LTE) e.g., from 3GPP LTE R8 and up; Line of sight probability indication (LOSPI); Negative ACK (NACK); Non-Terrestrial Network (NTN); Modulation and Coding Scheme (MCS); Multiple Input Multiple Output (MIMO); New Radio (NR); Orthogonal Frequency-Division Multiplexing (OFDM); Physical Layer (PHY); Process ID (PID); Paging Occasion (PO); Physical Random Access Channel (PRACH); Primary Synchronization Signal (PSS); Random Access (or procedure) (RA); Random Access Channel (RACH); Random Access Response (RAR); Radio access network Central Unit (RCU); Radio Front end (RF); Radio Link Failure (RLF); Radio Link Monitoring (RLM); Radio Network Identifier (RNTI); RACH occasion (RO); Radio Resource Control (RRC); Radio Resource Management (RRM); Reference Signal (RS); Reference Signal Received Power (RSRP); Received Signal Strength Indicator (RSSI); Service Data Unit (SDU); Sounding Reference Signal (SRS); Synchronization Signal (SS); Secondary Synchronization Signal (SSS); Switching Gap (in a self-contained subframe) (SWG); Semi-persistent scheduling (SPS); Supplemental Uplink (SUL); Transport Block (TB); Transport Block Size (TBS); Transmission/Reception Point (TRP); Time-sensitive communications (TSC); Time-sensitive networking (TSN); Uplink (UL); Ultra-Reliable and Low Latency Communications (URLLC); Wide Bandwidth Part (WBWP).

A WTRU may support synchronization during a same-physical cell identity (PCI) satellite switch. In one or more cases, the WTRU may receive assistance information about a same-PCI satellite switch (e.g., via broadcast signaling). The information may include timing information and/or incoming satellite location information at the time a same-PCI satellite switch will occur. The WTRU may pre-calculate a timing advance based on the future location of the incoming satellite at time of the same-PCI satellite switch. The WTRU may pre-report the future TA value at an indicated offset prior to satellite switch. The WTRU may resets an L3 measurement window at the time of the satellite switch, and may apply a measurement configuration. The measurement configuration may be pre-configured. The pre-configured measurement configuration may include, for example, but not limited to, denser measurement objects.

The WTRU may apply the pre-configured measurement configuration and may filter coefficients to assess new channel conditions.

The WTRU may provide capability and/or assistance information regarding resync time, for example, to assist with gap measurement configuration. In examples, the WTRU may ignore a pre-configured scheduling (e.g., CG, periodic SRS, and the like) during resync time.

The WTRU may scale power for an initial UL transmission to the incoming satellite. The WTRU may scale the power for the initial UL transmission based on difference in distance between the WTRU and former and incoming satellite. In one or more cases, the power scaling may be enabled based on a configuration/indication in a system information block (SIB). Additionally or alternatively, the power scaling may be based on probability of line of sight (e.g., LOSPI %>X).

The WTRU may measure reference signals from the incoming satellite to determine how to re-orient spatial filters when the new satellite takes over coverage. For example, the WTRU may measure reference signals from an incoming satellite, such as one or more SSB/CSI-RS from a neighboring cell. In one or more cases, the WTRU receives an indication/configuration of the reference signal in which a first time period (e.g., pre-switch) is QCL with a second reference signal in second time period (e.g., post switch) to link measurements between cell(s) originating from the satellites.

In one or more cases, the WTRU may optionally send an ACK (e.g., via SR, via pre-provisioned resources, using the earliest available CG resources, etc.) to the incoming satellite to confirm sync is re-gained. For example, the WTRU may optionally send the ACK via one or more of SR, pre-provisioned resources, using the earliest available CG resources, and the like.

A WTRU may be configured for use in non-terrestrial networks (NTN). Non-terrestrial networks (NTN) may facilitate deployment of wireless networks in areas where land-based antennas may be impractical and/or undesirable. For example, land-based antennas may be impractical due to geography and/or cost. Coupled with terrestrial networks, NTNs may provide ubiquitous 5G network coverage. Some example NTN deployments may support basic talk and text around the world. NTN deployments, coupled with proliferation of next-generation low-orbit satellites, may enable further services (e.g., web browsing).

An NTN may include an aerial, or space-borne, platform which, via a gateway (GW), may transport signals from a land-based gNB to a WTRU and vice-versa. Example NTN deployments may support a power class 3 WTRU with an omnidirectional antenna and linear polarization, or a small aperture antenna (VSAT) terminal with directive antenna and circular polarization. Example NTNs may provide support for LTE-based narrow-band IoT (NB-IoT) and eMTC type devices. In examples, regardless of device type, NTN WTRUs may be GNSS capable.

Aerial or space-borne platforms may be classified in terms of orbit. In some implementations, low-earth orbit (LEO) satellites may operate in an altitude range of 300-1500 km and geostationary earth orbit (GEO) satellites may operate in altitude range of 35-786 km. Additional platform classifications may, also or alternatively, be supported. For example, medium-earth orbit (MEO) satellites, which may operate in altitude range of 7000-25000 km, and high-altitude platform stations (HAPS), which may operate in altitude range of 8-50 km, may be supported. Satellite platforms may be further classified as having a "transparent"

or "regenerative" payload. Transparent satellite payloads may implement frequency conversion and RF amplification in both UL and DL. In some implementations, multiple transparent satellites may be connected to one land-based gNB. In some examples, regenerative satellite payloads may utilize either a full gNB or gNB DU onboard the satellite. Regenerative payloads may perform digital processing on the signal including, for example, demodulation, decoding, re-encoding, re-modulation, and/or filtering.

Figure 2:
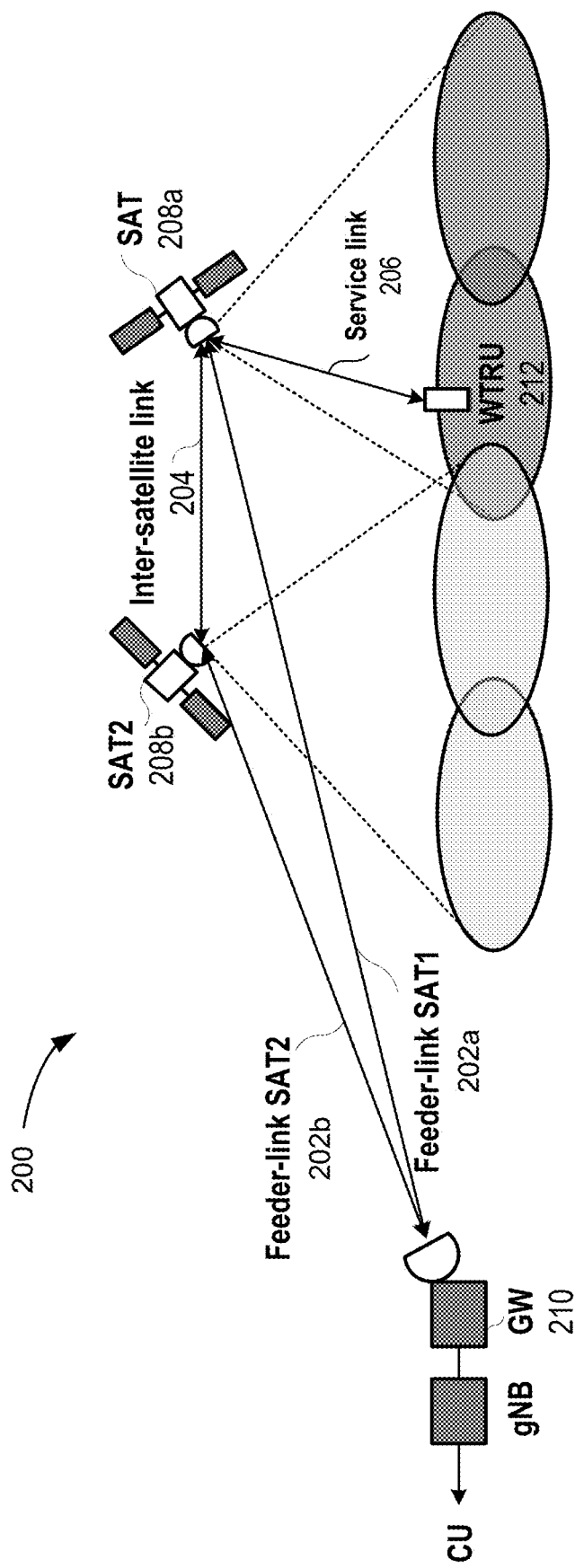
FIG. 2 illustrates example interfaces in a non-terrestrial network.

FIG. 2 illustrates example interfaces in a non-terrestrial network 200. The following radio interfaces may be defined in NTN. For example, a feeder-link 202a 202b may be a wireless link between the GW 210 and the satellite 208a 208b. A service link 206 may be a radio link between the satellite 208a 208b and the WTRU 212. In some implementations, the inter-satellite Link (ISL) 204 may be a transport link between satellite 208a and satellite 208b. The ISL 204 may be supported by regenerative payloads, and may be a 3GPP radio or proprietary optical interface.

A variety of communication interfaces (e.g., 3GPP) may be used for each radio link, for example, depending on the satellite payload configuration. For example, in a transparent payload, the NR-Uu radio interface may be used for both the service link 206 and the feeder-link 202a 202b. In examples, for a regenerative payload, the NR-Uu interface may be used for the service link 206, and a satellite radio interface (SRI) may be used for the feeder-link 202a 202b. In some implementations, ISLs may not be utilized. In examples, there may be a UP/CP protocol stack for a transparent payload configuration.

A NTN satellite may support multiple cells, in which each cell comprises one or more satellite beams. Satellite beams may cover a footprint on earth (e.g., like a terrestrial cell). The satellite beams may range in diameter (e.g., 100-1000 km in LEO deployments, 200-3500 km diameter in GEO deployments). Beam footprints in GEO deployments may remain fixed relative to earth. For LEO deployments, the area covered by a beam/cell may change over time due to satellite movement. In an example, the beam movement may be classified as "earth moving," in which the LEO beam may move continuously across the earth. In another example, the beam movement may be classified as "quasi-earth fixed," in which the beam may be steered to remain covering a fixed location until a new cell overtakes the coverage area in a discrete and coordinated change.

The round-trip time (RTT) and/or maximum differential delay may be larger than that of terrestrial systems, for example, based on the altitude of NTN platforms and/or beam diameter. In an example transparent NTN deployment, RTT may range from 25.77 ms (e.g., LEO at a 600 km altitude) to 541.46 ms (GEO), and maximum differential delay may range from 3.12 ms to 10.3 ms. In examples, the RTT of a regenerative payload may be approximately half that of a transparent payload. The RTT of a regenerative payload may be approximately half that of a transparent payload, for example, because a transparent configuration may consider both the service and feeder links, whereas the RTT of a regenerative payload may consider only the service link. To minimize impact to existing NR systems (e.g., to avoid preamble ambiguity or properly time reception windows), the WTRU may perform timing pre-compensation prior to initial access.

In one or more cases, the WTRU may be configured with user plane enhancements. The pre-compensation procedure may indicate for the WTRU to obtain the position of the WTRU via GNSS, and the feeder-link (or common) delay and satellite position via satellite ephemeris data. The satellite ephemeris data may be periodically broadcast in system information. In examples, the satellite ephemeris data may contain the satellite speed, direction, and/or velocity. The WTRU may estimate the distance (and thus delay) from the satellite. The WTRU may add the feeder-link delay component to obtain the full WTRU-gNB RTT. The full WTRU-gNB RTT may be used to offset timers, reception windows, or timing relations, including the ra-Response-Window, msgb-ReponseWindow, and the ra-Contention-ResolutionTimer. The network may perform the frequency compensation.

The WTRU may calculate the WTRU-specific TA (and thus the WTRU-gNB RTT), and example implementations may comprise a procedure to report the TA estimate to the network via new MAC CE. A Timing advance report (TAR) may be triggered, in some examples, if one or more of the following events occur. The TAR may be triggered upon indication from upper layers to trigger a Timing Advance report. If the WTRU has not previously reported a TA value to current serving cell, the TAR may be triggered based on a configuration of offsetThresholdTA by upper layers. In another example, the TAR may be triggered if the variation between current information about Timing Advance and the last reported information about Timing Advance is equal to or larger than offsetThresholdTA, if configured.

In one or more cases, the WTRU may be configured with HARQ and/or DRX enhancements. The WTRU may be semi-statically configured via RRC to apply a specific HARQ behavior to a set of HARQ process IDs. This semi-static configuration may be configured per serving cell. Further, the semi-static configuration may be optionally configured for both UL and DL HARQ processes via one or both of the optional configurations, downlinkHARQ-feedbackDisabled and uplinkHARQ-Mode. With respect to downlinkHARQ-feedbackDisabled, the WTRU may be configured per HARQ process ID, and indicates whether DL HARQ feedback is enabled or disabled. With respect to uplinkHARQ-Mode, the WTRU may be configured per HARQ process ID, and indicate whether an UL HARQ process uses HARQModeA or HARQmodeB. In examples, HARQmodeA may apply to transmissions with UL HARQ retransmission enabled, and HARQmodeB may apply to transmissions with UL HARQ retransmission disabled or with blind UL retransmission.

The WTRU may adapt DRX timers based on the configured HARQ characteristics of a HARQ process. DRX may be adapted for both UL and/or DL to either adapt DRX active time account for additional propagation delay (e.g., if HARQ feedback is enabled) and/or to enable additional WTRU power saving (e.g., if HARQ feedback is disabled). The WTRU may adapt the operation based on one or more of the following examples. The WTRU may adapt the DRX timers with respect to DL based on one or more of the following examples. For example, if downlinkHARQ-FeedbackDisabled is configured for this serving cell, upon DL reception, the WTRU may extend the length of the DL HARQ RTT Timer by the WTRU-gNB RTT (e.g., propagation delay) if HARQ feedback is enabled for the HARQ process. If downlinkHARQ-FeedbackDisabledis configured for this serving cell, upon DL reception, the WTRU may not start drx-RetransmissionTimerDL to enable additional power saving if HARQ feedback is disabled for the HARQ process. With respect to DL, if downlinkHARQ-FeedbackDisabled is configured for this serving cell, upon DL reception, the WTRU may apply legacy behavior (e.g., start drx-RetransmissionTimerDL after expiry of drx-HARQ-RTT-TimerDL) if downlinkHARQ-FeedbackDisabled is not configured.

The WTRU may adapt the DRX timers with respect to DL with respect to UL based on one or more of the following examples. For example, if uplinkHARQ-Mode is configured for this serving cell, upon UL transmission, the WTRU may extend the length of the DL HARQ RTT timer by the WTRU-gNB RTT (i.e., propagation delay) if HARQ process is configured as HARQModeA. If uplinkHARQ-Mode is configured for this serving cell, upon UL transmission, the WTRU may not start drx-RetransmissionTimerDL to enable additional power saving if HARQ process is configured as HARQModeB. If uplinkHARQ-Mode is configured for this serving cell, upon UL transmission, the WTRU may apply legacy behavior (e.g., start drx-RetransmissionTimerUL after expiry of drx-HARQ-RTT-TimerUL) if uplinkHARQ-Mode is not configured.

In one or more cases, the WTRU may be configured with LCP enhancements based on HARQ behavior. The WTRU may be configured to apply an LCP restriction based on the UL HARQ mode configured for the HARQ process ID an UL grant is assigned to. In one or more examples, WTRU behavior may be specified based on two optional RRC configurations, uplinkHARQ-Mode and allowedHARQ-Mode. uplinkHARQ-Mode may configure HARQ process IDs as, for example, either HARQModeA or HARQModeB. allowedHARQ-Mode may be configured per logical channel and sets the allowed HARQ mode of a HARQ process mapped to this logical channel.

Upon reception of a new UL grant, the WTRU may determine if allowedHARQ-mode is configured for this LCH, and/or if a HARQ Mode has been configured for the HARQ process of the UL grant. If both are configured, and the LCH is allowed to be mapped to the HARQ mode, the restriction may be satisfied and data from this logical channel may be mapped to the UL grant. If either uplinkHARQ-Mode or allowedHARQ-Mode are not configured, the WTRU may map this logical channel to any HARQ process.

In one or more cases, the WTRU may be configured with control plane enhancements. In examples, enhancements to RRC_CONNECTED adapt mobility and/or measurement procedures to non-terrestrial environments. Modifications to mobility may include additional execution conditions for conditional handover such as the A4 event, and time/location-based conditions. The location-based event may be defined by the condEventD1. The location-based event may be satisfied if the distance between the WTRU and a first reference location (e.g., within the serving cell) is above a threshold and a second reference location (e.g., within a neighboring cell) is below a threshold. The time-based event may be defined by the condEventT1. The time-based event may be satisfied if conditional handover execution occurs between, for example, T1 and T2, where T2=T1+a duration.

In example NTN implementations, both time and location-based trigger conditions may be simultaneously configured with a measurement condition (e.g., A4). Other modifications may apply to measurements, and may comprise one or more of the following: location-based measurement reporting, multiple synchronization signal block (SSB) based measurement timing configuration (SMTCs), and/or measurement gaps. Location-based measurement reporting may be based on eventD1, and may utilize a similar execution condition as condEventD1. Multiple SMTCs may be configured per carrier for a given set of cells based on, for example, propagation delay difference, feeder-link delay, and/or serving/neighbor cell satellite ephemeris. In examples, measurement gaps may be configured using the same or similar propagation delay differences as computed for SMTC.

A stationary WTRU may be expected to perform mobility functions for LEO deployments. Based on this, enhanced mobility is of special interest in LEO deployments. Due to satellite movement, a stationary WTRU may be expected to perform mobility, for example, approximately every 7 seconds depending on deployment characteristics.

Enhancements to IDLE/INACTIVE cell reselection may comprise new measurement rules. Two key enhancements may be based on a WTRUs distance from a cell reference point, and on the time a quasi-Earth cell may stop serving the current area (e.g., indicated by t-Service). The cell reference point, or the parameter used to evaluate the distance condition (e.g., t-Service and distanceThresh), may be optionally broadcast in a SIB (e.g., SIB19). SIB19 may be a new system information block which carriers NTN-specific information.

Location-based enhancement may enable measurement relaxation, for example, when the WTRU is located within a threshold (e.g., distanceThresh) from a cell reference point. In one or more implementations, the cell reference point may be the cell center. In some examples, there may be a cell reference point that is not the cell center. Based on conditions being satisfied, the WTRU may not perform intra-frequency measurements, measurements of NR inter-frequency cells of equal or lower priority, and/or inter-RAT frequency cells of lower priority. For example, the WTRU may not perform the above if all following conditions are satisfied: the serving cell fulfils Srxlev>SIntraSearchP and Squal>SIntraSearchQ; the WTRU has valid WTRU location information (i.e., WTRU implementation has available WTRU location information; and the distance between the WTRU and the serving cell reference location is shorter than distanceThresh.

Time-based enhancement may indicate for the WTRU to perform cell re-selection measurements in a quasi-earth fixed cell at some time based on WTRU implementation (e.g., prior to t-Service). In examples, the WTRU may perform intra-frequency, inter-frequency, and/or inter-RAT measurements before t-Service regardless of the distance between the WTRU and serving cell measurement or whether the serving cell fulfils Srxlev>SIntraSearchP and Squal>SIntraSearchQ, or Srxlev>SnonIntraSearchP and Squal>SnonIntraSearchQ. Distance and time-based measurement rules may not affect measurement of higher-priority NR inter-frequency and/or inter-RAT frequencies. In examples, the WTRU may perform these measurements regardless of remaining service time and/or distance from the cell reference point.

In one or more cases, the WTRU may be configured for IoT NTNs. In examples, NR NTN enhancements may be utilized for IoT NTN. For example, the enhancements may include: time/frequency precompensation; timing advance reporting; timer and monitoring window offset; and/or cell (re)selection enhancements based on t-service. Some implementations may support enhancements such as disabled HARQ feedback and/or mobility enhancements.

IoT NTNs may utilize enhancements related to consideration of discontinuous coverage scenarios. Discontinuous coverage for NTNs may refer to temporary and/or predictable coverage gaps caused by non-continuous coverage in non-geostationary satellite orbits (NGSO) deployments. This may not be an issue if continuous coverage is available globally, but continuous coverage may not be available globally in some NTN implementations (e.g., early deployments, deployments in deeply rural areas). IoT NTNs may provide enhancements to address discontinuous coverage scenarios. In some examples, these enhancements may not be present for NR NTNs.

Due to deterministic satellite movement, coverage gaps may be predicted and accounted for. IoT NTNs may support additional assistance information (e.g., satellite ephemeris and coverage parameters such as footprint radius, cell reference points or elevation angles, and/or the start time of service for a neighboring cell given by t-servicestart) to predict the duration of a coverage gap. While within a discontinuous coverage gap, the WTRU may suspend AS functionality.

In some implementations, there may be enhancements for NR NTNs. For example, NR NTN enhancements may include: coverage enhancements, NR-NTNs above 10 GHz, network (NW) verified WTRU location, and/or NTN-NTN and NTN-TN mobility and/or service continuity. Coverage enhancements may include enhancements to PUCCH for Msg4 HARQ-ACK, DMRS bundling for PUSCH (e.g., considering NTN-specific issues), and support for blind MSG3 retransmission grant reception. For NR-NTN above 10 GHz, there may be an analysis of, for example, regulations and adjacent channel co-existence scenarios, Rx/Tx requirements for satellite access node and WTRU class, and/or values for physical layer parameters. There may be enhancements for network verified WTRU location, for example, multi-RTT to support network verified WTRU location. For NTN-NTN and NTN-TN mobility and service continuity, there may be enhancements related to, for example: cell (re)selection for NTN-TN and earth moving cells, handover to reduce signaling overhead, and/or Xn/NG signaling to support feeder link switches.

In some implementations, there may be enhancements for IoT NTNs. For example, IoT NTNs enhancements may include: performance enhancements, mobility enhancements, and/or discontinuous coverage scenarios. For performance enhancements, there may be support for disabled HARQ feedback and/or improved GNSS operations for a new position fix for WTRU pre-compensation during long connection times. For mobility enhancements, there may be measurement triggering before RLF, signaling in system information of neighbor cell ephemeris, adopting Rel-17 solutions introduced in NR-NTN for mobility enhancement, and/or WTRU RRM core requirements for listed features. For discontinuous coverage scenarios, enhancements may include specifying mobility management enhancements and/or power saving enhancements for discontinuous coverage.

In one or more cases, the WTRU may be configured for synchronization during same-PCI satellite switch. In some NTNs, cells originating from different satellites may be associated with different PCIs. A stationary WTRU may experience continuous L3 mobility as the serving satellite moves overhead and out of coverage (e.g., due to the curvature of the earth), and a new satellite may take over coverage of the geographic area.

Figure 3:
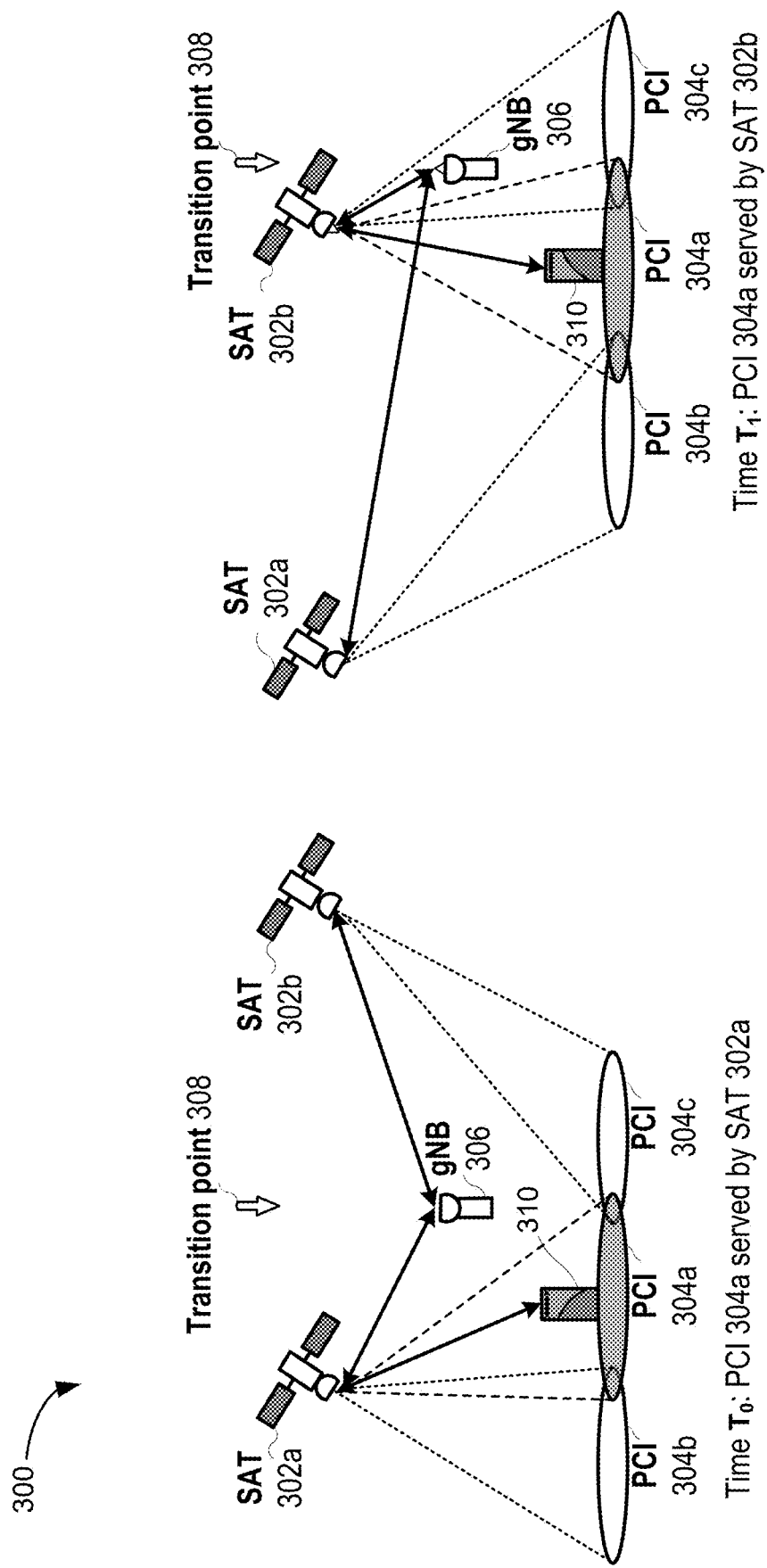
FIG. 3 illustrates an example of two satellites serving the same PCI.

FIG. 3 illustrates an example same-PCI switch 300 where the satellites 302a 302b serve the same PCI 304a. For quasi-earth fixed cell cases, a hard switch may occur in the same SSB frequency and same gNB. In such quasi-earth fixed cell cases, satellite switching without PCI switching may be supported. In the example 300, a PCI switch is shown. A WTRU 310 may support re-synchronization to an incoming satellite 302b serving the same PCI 304a. Methods and implementations for WTRU re-synchronization may reduce interruption time during satellite switching and avoid unnecessary radio link failure (RLF).

In the example same-PCI switch 300, a geographic area is associated with the PCIs 304a 304b 304c and gNB 306. At time $T_0$, PCI 304a is served by a first satellite 302a. As the first satellite 302a moves out of range (e.g., due to the curvature of the earth), a second (incoming) satellite 302b connected to the same gNB 306 may begin to serve the PCI 304a. This may occur at some transition point 308 which can be known ahead of time by the network. This solution avoids the need for L3 mobility, thus reducing signaling overhead. However, since the former 302a and incoming 302b satellites are physically located far away, the WTRU 310 must re-synchronize to the new satellite 302b because the radio conditions, timing advance, doppler compensation, and UL beam direction may be very different. Since the PCI 304a, gNB 306, and SSB frequency remain the same, the satellite switch may be mostly transparent to the WTRU 310, and the WTRU 310 may need some assistance information to facilitate resynchronization to the incoming satellite 302b. The WTRU 310 may support re-synchronization to the incoming satellite 302b serving the same PCI 304a. WTRU re-synchronization may reduce interruption time during satellite switching and avoid unnecessary RLF.

A WTRU may be configured for time synchronization during a same-PCI satellite switch. In one or more cases, prior to same-PCI satellite switch, the WTRU may receive a configuration for pre-reporting timing advance and assistance information for incoming satellite (e.g., time and incoming satellite position at same-PCI satellite switch). The WTRU may receive the configuration to reduce TA re-synchronization time and congestion due to large scale TA reporting. The WTRU may calculate the timing advance of the incoming satellite at the time of the same-PCI satellite switch using the assistance information and report the future TA at a configured offset to the satellite switch time. The future TA at the configured offset to the satellite switch time may indicate, for example, the TA value that applies to the incoming satellite. At the time of a satellite switch, the WTRU may apply the pre-calculated TA for subsequent transmissions. If the WTRU has successfully reported the TA to the incoming satellite prior to satellite switch, the WTRU may ignore TAR triggering (e.g., due to offsetThresholdTA configuration).

In some examples, the WTRU may calculate a TA value via ephemeris prior to RACH. As such, a large time difference at the time of a same-PCI satellite switch (which doesn't require RACH) may cause TA sync failure. Relying on some triggers for TA reporting (e.g., offsetThresholdTA) may cause large signaling overhead after switch time. Thus, to address the issues of these systems, the WTRU may pre-calculate the TA based on the future location of the incoming satellite at time of same-PCI satellite switch. The WTRU may pre-report the future TA value, for example, at an indicated offset prior to satellite switch.

The WTRU may receive (e.g., via broadcast) the time and position of the incoming satellite for the same-PCI satellite switch. In one or more cases, the WTRU may receive a configuration for pre-reporting the TA to the new satellite (pre-TAR). The WTRU may receive a configuration comprising one or more of: an enable/disable indication for pre-TAR reporting; an offset prior to the satellite switch time to report the pre-TAR; a time period to report the pre-TAR; and/or conditions to report the pre-TAR. Conditions to report the pre-TAR may include, for example, a delta threshold from the TA to the former satellite. In one or more cases, the WTRU may pre-calculate the TA value for the incoming satellite using the position of incoming satellite at time of the PCI switch. In one or more cases, the WTRU may transmit the pre-calculated TA value according to the pre-reporting configuration. In examples, the pre-reporting configuration may indicate that the TA value is associated with the incoming satellite. In one or more cases, the WTRU may apply the pre-calculated TA to the incoming satellite at time of same-PCI satellite switch. For the cases in which the WTRU was able to successfully report future timing advance prior to satellite switch (e.g., the WTRU receives an ACK to the transmission carrying the pre-TAR), the WTRU may ignore the trigger condition if offsetThresholdTA is configured and TAR is triggered due to the satellite switch. For the cases in which the WTRU was not able to successfully report future timing advance prior to satellite switch, the WTRU may transmit a TAR at time of the satellite switch using the pre-calculated timing advance. In one or more cases, the WTRU may transmit an UL TB using the pre-calculated TA (e.g., after the same-PCI satellite switch).

A WTRU may be configured for radio link monitoring (RLM) during a same-PCI satellite switch. After a same-PCI satellite switch, measurements and/or cell quality information associated with the former satellite may be no longer valid. To avoid channel conditions to incoming satellite being averaged out, the WTRU may reset the L3 measurement window at time of the satellite switch. The WTRU may apply a new measurement configuration (e.g., a temporary configuration with a denser set of measurement objects) and/or L3 filter coefficients after the satellite switch to acquire measurements and re-sync to incoming satellite. The WTRU may temporarily suspend L3 event-based reporting by some offset prior to satellite switch and/or after the satellite switch to avoid unnecessary reporting and mobility. For example, to avoid using resources reporting to a no longer available cell, the WTRU may temporarily suspend L3 event-based reporting by some offset prior to satellite switch as if channel conditions are about to change. Alternatively or additionally, the WTRU may temporarily suspend L3 event-based reporting by some offset to allow for time to properly measure new channel conditions.

In some implementations, the WTRU may average cell measurements over time to obtain L3 cell quality. This process may delay detection of radio issues for the new satellite after the satellite switch, and quickly communicating new measurements with the incoming satellite may require a measurement reconfiguration after satellite switch. A measurement reconfiguration may be time consuming considering WTRU-gNB RTT and/or risk of RLF. In examples, to address the above problem, the WTRU may reset the L3 measurement window at time of the satellite switch and may apply a pre-configured measurement configuration (e.g., with denser measurement objects) and/or filter coefficients to quickly assess new channel conditions.

In one or more cases, the WTRU receives (e.g., via broadcast) the time when a same-PCI satellite switch will occur. The WTRU may receive a measurement configuration to apply at the time of same-PCI satellite switch. The measurement configuration may comprise one or more of: a temporary measurement configuration; expiry conditions for temporary measurement configuration (e.g., number of measured RSs, time duration etc.); a second measurement configuration (e.g., to apply after temporary measurement configuration); L3 filter coefficients to apply at the time of satellite switch; and/or a configuration to suspend measurement reporting. Configuration information indicating to suspend measurement reporting may comprise of one or both of, for example, a start time and duration.

The WTRU may perform the same-PCI satellite switch based on the received configuration. The WTRU may perform one or more of the following actions related to performing a same-PCI satellite switch: suspend measurement reporting (e.g., subject to some configured prohibit duration); reset an L3 measurement window (e.g., discarding previous serving cell measurements); apply a temporary measurement configuration; and/or apply updated L3 filter coefficients. In examples, the expiry conditions for temporary measurement configuration may not be satisfied, or not configured, and the WTRU may perform measurements according to the temporary measurement configuration and filtering based on updated L3 filter coefficients. If the expiry conditions for temporary measurement configuration are satisfied, and WTRU has not been provided with a second measurement configuration, the WTRU may revert to a previous measurement configuration (e.g., the configuration used prior to satellite switch). The WTRU may transmit a measurement report based on the new measurement configuration.

A WTRU may be configured for transmission handling for same-PCI satellite switching. WTRU re-synchronization time associated with a same-PCI satellite switch may vary based on the WTRU's capability to determine, or pre-determine, aspects of synchronization (e.g. timing advance, power control, etc.). During re-synchronization, transmission and/or reception may be suspended. If the network is unaware of the WTRU's re-synchronization time, there may be associated risks. For example, there may be a risk of additional latency and wasted transmission opportunities (e.g., if re-synchronization time is over estimated), or missed transmitting (TX) and/or receiving (RX) occasions (e.g., if re-synchronization time is under-estimated). To support re-synchronization gap configuration, the WTRU may send capability and/or assistance information (e.g., estimated re-synchronization time) prior to the satellite switch. During re-synchronization, the WTRU may suspend TX and/or RX including, for example, pre-scheduled transmissions such as configured grants, periodic CSI/SRS, etc. In one or more examples, following re-synchronization, the WTRU may signal that synchronization is completed (e.g., via transmission of one or more UL signals. Examples of UL signals may include, for example but not limited to: SR, transmission on CG, PRACH, HARQ ACK, and the like.

In some implementations, the WTRU may rely on network scheduling and/or configuration of periodicity for pre-configured transmissions to ensure that WTRU transmission and/or reception does not occur during re-synchronization to a new satellite. If the network's estimation of re-sync time is incorrect, re-synchronizing to a new satellite may cause wasted resources (e.g., over estimation), or missed TX and/or RX (e.g., underestimation). To address the issues in these systems, the WTRU may provide capability and/or assistance information regarding resync time to assist measurement gap configuration. The WTRU may ignore a pre-configured scheduling (e.g., CG, periodic SRS, and the like) during resync time. Alternatively or additionally, the WTRU may optionally send an ACK to confirm sync is re-gained. For example, the WTRU may optionally send the ACK via one or more of an SR, pre-provisioned resources, using the earliest available CG resources, and the like.

The WTRU may receive (e.g., via broadcast) configuration information indicating a time that a same-PCI satellite switch will occur. In one or more examples, the WTRU may transmit assistance information prior to the same-PCI satellite switch. The assistance information may, for example, include one or more of: a re-synchronization duration; a WTRU's capability to perform synchronization procedures (e.g. timing advance pre-calculation and reporting) prior to same-PCI satellite switch; and/or a time when the WTRU can resume TX and/or RX after the same-PCI satellite switch. The WTRU may receive configuration information for satellite re-synchronization. The configuration for satellite re-synchronization may, for example, comprise one or more of: a resynchronization gap configuration; conditions to declare resynchronization failure; and/or resources (e.g., an UL grant, dedicated RACH preamble) to indicate successful re-synchronization.

The WTRU may perform the same-PCI satellite switch to the second satellite, for example, based on the configuration information indicating the time for the same-PCI satellite switch. In performing the same-PCI satellite switch, the WTRU may start a resynchronization gap, suspend UL TX and/or DL RX, and perform one or more re-synchronization procedures (e.g., timing advance calculation, doppler compensation, power control, measurements) for the incoming satellite. The WTRU may start a resynchronization gap using the received configuration information. The WTRU may transmit an indication of successful resynchronization (e.g., via provided resources), if configured to do so, following successful re-synchronization to satellite.

A WTRU may be configured for power control for same-PCI satellite switching. The UL TX power required by the WTRU after a satellite switch may vary significantly, for example, due to the large difference in location between former and incoming satellites. If the WTRU uses too little power, the WTRU risks unsuccessful reception. If the WTRU uses too much power, the WTRU risks interference and unnecessary power consumption. In examples, line-of-sight (LOS) may be probable (e.g., highly probable) in NTN environments. If LOS is present, the largest component of pathloss may be due to free space propagation losses.

The WTRU may estimate free space propagation losses based on known information. For example, the WTRU may estimate free space propagation losses based on the known the location of the former and incoming satellites (e.g., via assistance information). Using the estimate of free space propagation, the WTRU may scale the UL transmission power for the initial transmission to the incoming satellite based on the delta-distance from the former satellite. The UL transmission power may be additionally controlled by NW configuration (e.g., enabled/disabled, maximum allowed delta scaling). Also or alternatively, UL transmission power may be subject to conditions. For example, UL transmission power may be based on the probability of line of sight (LOSPI) to the former and/or incoming satellite being above a configured threshold.

In some examples, the WTRU may wait to adjust UL transmission power after a satellite switch until a power control command is received. In such examples, waiting for a power control command to adjust UL TX power may risk failed transmission(s) (e.g., if initial power is too low), or interference and/or excess power consumption (e.g., if power control is too high). To address this, the WTRU may scale the power utilized for the initial UL transmission to the new satellite based on the difference in distance between the WTRU, the old, and the new satellite. In examples, the scaled power may be enabled based on a configuration and/or indication in a SIB. Also or alternatively, the scaled power may depend on a high probability of line of sight (i.e., LOSPI %>X).

The WTRU may receive (e.g., via broadcast) assistance information for the former and incoming satellite. The assistance information may include one or more of: ephemeris data of the current serving satellite; the time of the same-PCI satellite switch; and/or the position of an incoming satellite at time of same-PCI satellite switch. In one or more cases, the WTRU may receive configuration information for calculating the UL TX power to the incoming satellite. The configuration for calculating the UL TX power may comprise one or more of: an enable/disable indication; a maximum delta value the original TX power may be autonomously adjusted by the WTRU; a minimum line-of-sight probability threshold for the former and incoming satellite; and/or a determination as to whether to indicate by how much the WTRU has adjusted the UL TX power and/or the UL TX power level (e.g., within the first transmission). In one or more cases, the WTRU may acquire updated WTRU information (e.g., via GNSS). The WTRU may calculate the WTRU-to-satellite distance for each satellite at the time of a same-PCI satellite switch (e.g., using the satellite assistance information). In one or more cases, the WTRU may calculate the line-of-sight probability to each satellite. In examples, for a same-PCI satellite switch, if WTRU autonomous UL TX power adjustment is enabled and line-of-sight conditions to the former and incoming satellite have been satisfied: the WTRU may adjust the UL TX power (e.g., proportional to the relative distance between the two satellites). The WTRU may transmit an initial UL transmission using the adjusted UL TX power. The WTRU may include the delta adjustment and/or current UL TX power in initial transmission (e.g., if configured by the network). In examples, for a same-PCI satellite switch, if WTRU autonomous UL TX power adjustment is not enabled and/or Line-of-sight conditions to the former and incoming satellite have not been satisfied, the WTRU may transmit an initial UL transmission with the UL TX power used for transmission to the former satellite.

A WTRU may be configured for beam management during same-PCI satellite switch. The serving and incoming satellite during a same-PCI satellite switch may be in different locations. As such, the WTRU may re-orient the UL TX beam after the satellite switch. The WTRU may predict how to re-orient the WTRU spatial filters, for example, using a reference signal from a neighboring cell (e.g., SSB/CSI-RS) that originates from the incoming satellite that will take over the PCI. To support this mapping, the WTRU may receive an indication and/or configuration that a reference signal (e.g., originating from the incoming satellite) in a first time period (e.g., prior to satellite switch) is quasi-co-located (QCL) with a second reference signal in second time period (e.g., after satellite switch). As such, the WTRU may apply measurements made prior to the switch to pre-determine the beam direction and channel conditions to the incoming satellite after the switch, thereby speeding up resynchronization to the incoming satellite.

In some examples, the WTRU may wait to determine how to re-orient spatial filters and perform channel measurements until after a satellite switch event, thus increasing re-synchronization time. To address the issues in legacy systems, the WTRU may measure reference signals from the incoming satellite (e.g., some SSB/CSI-RS from a neighboring cell) to understand how to re-orient spatial filters when the incoming satellite takes over coverage. The WTRU may receive an indication and/or configuration of the reference signal in first time period (i.e., pre-switch) is QCL with a second reference signal in second time period (i.e., post switch) to link measurements before and after switch.

The WTRU may receive (e.g., via broadcast) configuration information indicating the time of same-PCI satellite switch. In one or more cases, the WTRU may receive an indication and/or configuration that a reference signal in a first time period (e.g., prior to satellite switch) is QCL with a second reference signal in second time period (e.g., after satellite switch). In examples, the WTRU may measure reference signals originating from the incoming satellite during the first time period. In one or more cases, the WTRU calculates the beam direction and DL pathloss to the incoming satellite using reference signals from the first time period. Upon a same-PCI satellite switch, the WTRU may re-orient the UL TX beam (e.g., via application of an updated spatial filter) of the WTRU and adjusts the transmit power for initial UL transmission (e.g., based on the measured DL pathloss from the first period) based on the mapping configuration and reference signal measurements from the first time period. In examples, the WTRU may link measurements from the first time period to measurements in the second time period. In examples, the WTRU may transmit a same-PCI satellite switch confirmation (e.g., using MAC CE or pre-configured PUCCH) using a determined UL TX beam and transmission power calculated based on reference signal received power (RSRP) of the reference signal during first time period.

It is noted that the term "former satellite" may refer to the satellite serving the PCI prior to a same-PCI satellite switch. Further, it is noted that the term "incoming satellite" may refer to the satellite serving the PCI after a same-PCI satellite switch. It is noted that the term "temporary measurement configuration" may refer to a measurement configuration applied at, or near, the time of a same-PCI satellite switch to, for example, support quick re-synchronization to incoming satellite. Additionally, it is noted that the term "resynchronization gap" may refer to a period indicated or configured by the network in which the WTRU is expected to perform one or more aspects of resynchronization to an incoming satellite during same-PCI satellite switch. It is also noted that the term "WTRU autonomous power adjustment" may refer to an adjustment of UL transmission power by the WTRU for an initial UL transmission to the incoming satellite after a same-PCI satellite switch.

Methods and embodiments described herein may refer to same-PCI satellite switch examples. However, it should be understood that embodiments may apply to other non-terrestrial mobility scenarios, such as, but not limited to: feeder-link switch, quasi-earth fixed cell change, and/or inter-satellite mobility and/or cell (re)selection (e.g., by substituting "same-PCI satellite switch" with one or more of the above scenarios in a given solution). Additionally, it should be understood that the embodiments may apply to multi-TRP scenarios, in which more than one TRP serves a PCI, and resynchronization during RACH-less handover. Further, the embodiments described herein may support resynchronization enhancements (e.g., faster resynchronization) for an incoming satellite during a same-PCI satellite switch. As such, methods and embodiments may reduce service interruption time and/or reduce the risk of RLF due to mis-synchronization. In examples, these embodiments may allow pre-synchronization, thereby reducing the risk of congestion caused by signaling overhead after the satellite switch. It is noted that that embodiments discussed herein may be combined with one or more of the other embodiments discussed herein.

A WTRU may be configured with configuration and/or assistance information to support resynchronization to an incoming satellite. To support same-PCI satellite switch resynchronization, the WTRU may receive assistance information and/or configurations from the network. The assistance information and/or configurations may be provided, for example, via dedicated signalling (e.g., via RRC signalling, MAC CE, or DCI), broadcast in system information, or both. For example, the WTRU may receive assistance information, such as same-PCI switch time and information related to neighbour satellite position in a broadcast manner, and the WTRU may receive configuration information for TA calculation, measurement reporting, resynchronization gap configuration, power control and/or beam management in a dedicated manner (e.g., via RRC). In one or more cases, the WTRU may (e.g., via configuration) receive and maintain updated system information at a time prior to a same-PCI satellite switch. The WTRU may receive and maintain the updated system information at a time prior to a same-PCI satellite switch to minimize the risk of resynchronization failure and ensure that the necessary information is available at time of same-PCI satellite switch.

The WTRU configuration and/or assistance information provided in a dedicated manner may override assistance information received via broadcast indication in some cases. For example, the WTRU may receive one or more of the following assistance information and/or configuration(s) to support same-PCI satellite switch resynchronization: a time of same PCI satellite switch (e.g., 10:31:20 UTC time); a location of the incoming satellite at time of same-PCI satellite switch; a location of the former satellite at time of same-PCI satellite switch; ephemeris data of the incoming satellite (e.g., to support the WTRU prediction of the incoming satellite location at time of same-PCI satellite switch); the ephemeris data of the former satellite (e.g., to support the WTRU prediction of the former satellite location at time of same-PCI satellite switch); the common time information (e.g., the feeder-link delay, kmac, and the like) for the incoming satellite and/or former satellite (e.g., at the time of same-PCI satellite switch); information and/or configuration(s) to support pre-calculation and reporting of timing advance to the incoming satellite; information and/or configuration(s) to support radio-link monitoring; information and/or configuration(s) to resynchronization gap and RX/TX suspension; information and/or configuration(s) to support WTRU autonomous UL power adjustment; information and/or configuration(s) to support beam management; information and/or configuration(s) to support resynchronization status indication.

In one or more examples, the WTRU may be configured to request incoming satellite assistance information during a same-PCI satellite switch. The WTRU may request assistance information to support resynchronization to an incoming satellite during same-PCI satellite switch. For example, if the WTRU was unable to acquire one or more information fields necessary to complete resynchronization prior to same-PCI satellite switch, the WTRU may trigger a request. Alternatively or additionally, the WTRU may trigger a request for assistance information, based on connection establishment (e.g., upon initial access, service resumption) or mobility. In one or more cases, the request for assistance information may be sent via, for example, UCI, SR, RACH messaging (e.g., MSGA, MSG3, MSG5), PUSCH, MAC CE, and/or RRC signalling. The assistance information request may include a general request (e.g., a flag indicating requesting all available information). The assistance information may indicate one or more specific information fields to be provided to the WTRU.

A WTRU may be configured for time synchronization for a same-PCI satellite switch. Due to the incoming and former satellites during a same-PCI satellite switch being physically located very far away, the WTRU may experience a large difference in timing advance when the satellite switch occurs. In examples (e.g., legacy implementations), a WTRU may calculate a TA value via ephemeris prior to RACH. Based on this, there may be a TA difference at the time of a same-PCI satellite switch (e.g., which may not require RACH), which may cause TA sync failure. In examples, relying on existing triggers for TA reporting (e.g., offsetThresholdTA) may cause congestion after the satellite switch due to, for example, signaling overhead from large scale TA report triggering.

Methods and embodiments described herein may reduce TA re-synchronization time, and/or lower the risk of congestion after a satellite switch (e.g., due to large scale TA reporting). For example, a WTRU may pre-calculate TA values based on the future location of an incoming satellite at time of same-PCI satellite switch, and pre-report the future TA value at an indicated offset prior to satellite switch.

In one or more implementations, the WTRU may be configured to pre-calculate a timing advance to an incoming satellite. The WTRU may pre-calculate the TA to an incoming satellite for the time of same-PCI satellite switch. The WTRU may pre-calculate the TA to, for example, enable fast timing synchronization to an incoming satellite after the same-PCI satellite switch. In examples, the network may control (e.g., enable/disable) the ability of the WTRU to pre-calculate TA via one or more of an explicit RRC configured, indication in broadcast signalling, and a (de) activation command (e.g., via MAC CE). The network may configure a window (e.g., a time period) and/or offset from the same-PCI satellite switch for the WTRU to pre-calculate the TA. For cases in which the WTRU is unable to determine the future TA by the expiration of this time period, or by an indicated time, the WTRU may not pre-calculate the timing advance. For the cases in which the timing advance pre-calculation is enabled and the WTRU is unable to perform the pre-calculation, the WTRU may send a report or indication to the network.

To support TA pre-calculation, the WTRU may use configuration and/or assistance information corresponding to the incoming satellite to determine, for example, the common timing information (e.g., feeder-link delay) and/or location of the satellite at the time of same-PCI satellite switch. This information may be, for example, the explicit position of the satellite at the time of same-PCI satellite switch. Alternatively or additionally, the WTRU may use ephemeris data of the incoming satellite to predict the location of satellite at the time of same-PCI satellite switch. The WTRU may acquire the location of the WTRU (e.g., via GNSS) and calculate the distance between the WTRU and incoming satellite at time of same-PCI satellite switch. Using the distance between the WTRU and incoming satellite to estimate the service link delay, the WTRU may add the common timing information from the incoming satellite to determine the full timing advance between the WTRU and incoming satellite at time of same-PCI satellite switch. The WTRU may store the pre-calculated value to be applied for subsequent UL transmissions at and/or after the time of same PCI satellite switch (or another explicitly indicated time).

In one or more cases of timing advance pre-calculation, the WTRU may be requested and/or triggered to report the location of the WTRU for the network to calculate the WTRU timing advance. The WTRU may be requested and/or triggered, for example, at an offset prior to same-PCI satellite switch, to report the location of the WTRU. In some cases, the WTRU may be requested and/or triggered to report the estimated WTRU location at the time of satellite switch. In examples, the network may provide a timing advance command with an associated activation time. The associated activation time may be, for example, the same PCI satellite switch. In one or more cases, the WTRU may apply the TA value to transmissions occurring after the activation time.

For the cases in which the WTRU has pre-reported the TA value, the WTRU may receive additional TA adjustments from the network prior to the satellite switch. For example, the network may indicate (e.g., explicitly) whether a TA command is for the current TA (e.g., to the former satellite) or for the future TA (e.g., to the incoming satellite).

In one or more cases, the WTRU may be provided with two types of ephemeris information for determining timing advance values. A first type of ephemeris information may be used to determine one or more transmission parameters for a current uplink transmission. The first type of ephemeris information may be used to determine one or more transmission parameters for a first time window. The transmission parameters may be, for example, WTRU-specific and/or cell-specific timing advance value, K_offset, K_mac, and the like. A second type of ephemeris information may be used to determine one or more transmission parameters for a future uplink transmission. The second type of ephemeris information may be used to determine one or more transmission parameters for a second time window. In one or more cases, the first type of ephemeris information may be associated with current satellite and the second type of ephemeris information may be associated with incoming satellite. In one or more cases, the second type of ephemeris information may be provided by the current satellite. In one or more cases, one or more ephemeris information may be configured or provided to the WTRU (e.g., via a higher signaling) and each ephemeris information may be indicated or associated with time information. Time information may include, for example, a validity timer, time stamp, validity duration, starting time, start/end time, and the like.

The WTRU may report the timing advance to the incoming satellite. The WTRU may report the TA based on a configuration. The WTRU may report the pre-calculated TA to the incoming satellite ahead of the same-PCI satellite switch. The WTRU may report the pre-calculated TA to the incoming satellite to reduce congestion after same-PCI satellite switch caused by large-scale TAR. The WTRU TA pre-reporting (i.e., pre-TAR) may be subject to configuration, which may include one or more of the following: an enable/disable indication; an offset from the same-PCI switch time to perform the pre-TAR; a window (e.g., time period) to report the pre-TAR; and/or resources (e.g., an UL scheduling grant) to report pre-TAR which information fields to include within a pre-TAR (e.g., service link TA vs. full TA).

The WTRU may pre-report the TA to the incoming satellite. For example, the WTRU may pre-report the timing advance to the incoming satellite if a valid configuration is provided and/or upon an explicit network request. Alternatively or additionally, the WTRU may report the TA value ahead of time subject to one or more pre-configured conditions. For example, the WTRU may transmit a pre-TAR for the cases in which the difference in TA between the former and incoming satellite is larger than a threshold.

For the cases in which timing advance pre-reporting is enabled and all configured conditions are satisfied, the WTRU may trigger transmission of a pre-TAR. A pre-TAR may include one or more of the following: an explicit indication that the TAR corresponds to a future timing advance value (e.g., to the incoming satellite at time of same-PCI satellite switch); an absolute TA value corresponding to the full WTRU-gNB timing advance; an absolute TA value for the service link (e.g. WTRU-incoming satellite timing delay); the delta from the currently applied timing advance (e.g., to the former satellite); information used to pre-calculate the TA (e.g., the location and timing information of the incoming satellite); and/or a WTRU estimate of when the WTRU will be time synchronized (e.g., when the WTRU applies the TA value to subsequent UL transmissions).

In one or more cases, the WTRU may be configured to perform one or more actions at the time of a same-PCI satellite switch. At the time of a same-PCI satellite switch (or an explicitly indicated activation time), the WTRU may apply the pre-calculated TA value and use the value for subsequent transmissions. If the WTRU is configured with offsetThresholdTA and the application of the new TA value triggers a timing advance report (TAR), the WTRU may ignore the TAR trigger if the WTRU has already pre-reported the TA value to the incoming satellite. The WTRU may ignore the TAR trigger by not triggering TAR and sending an updated report. In an example, the WTRU may ignore the trigger subject to confirmation that the pre-reported timing advance value has been successfully received. The WTRU may assume successful reception, for example, based on reception of HARQ-ACK.

Figure 4:
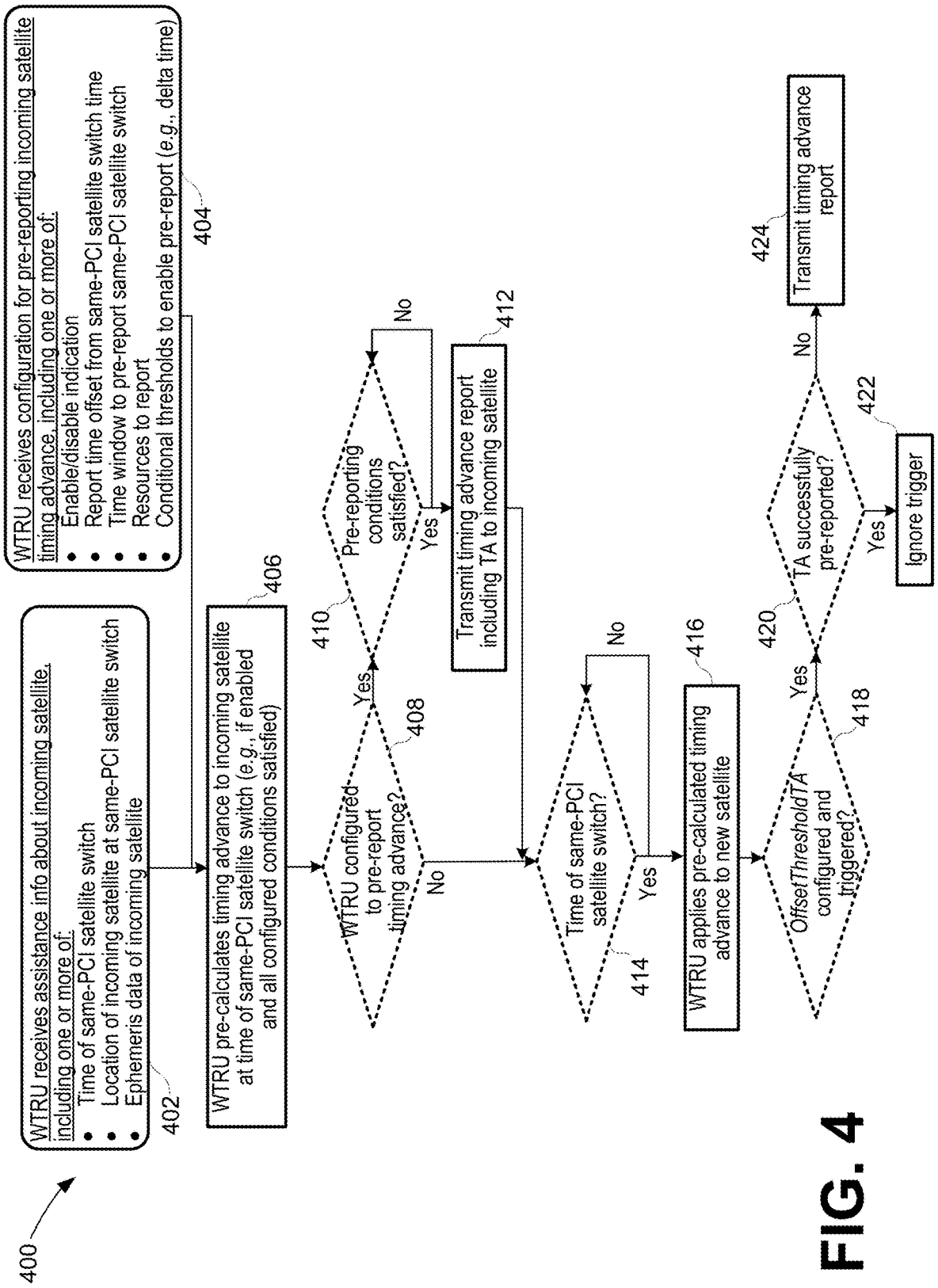
FIG. 4 is a flowchart illustrating timing advance pre-calculation and reporting to an incoming satellite during a same-PCI satellite switch.

FIG. 4 is a flowchart illustrating a process 400 of timing advance pre-calculation and reporting to an incoming satellite during a same-PCI satellite switch. In one or more cases, prior to the satellite switch, the WTRU may receive TA reporting configuration and information regarding time and position of neighbor satellite at satellite switch point. At 402, the WTRU may receive assistance information about the incoming satellite. The assistance information received at 402 may include one or more of: the time of same-PCI satellite switch; the location of incoming satellite at same-PCI satellite switch; and/or ephemeris data of incoming satellite. At 404, the WTRU may receive configuration information for pre-reporting an incoming satellite timing advance. For example, the configuration information received at 404 may comprise: An enable/disable indication; a report time offset from same-PCI satellite switch time; a time window to pre-report same-PCI satellite switch; resources to report; and/or conditional thresholds to enable pre-report (e.g., delta time).

At 406, the WTRU may pre-calculate the timing advance to incoming satellite for the time of the same-PCI satellite switch (e.g., if enabled and all configured conditions satisfied). If the WTRU is configured to pre-report timing advance at 408, and the pre-reporting conditions satisfied at 410, then the WTRU may transmit timing advance report including TA to incoming satellite at 412. The WTRU may report the new TA at a configured offset to the transition time. The WTRU may report a new TA at a configured offset to the transition time may indicate the timing advance value to the new satellite. If the WTRU is not configured to pre-report timing advance at 408, or if the WTRU transmitted a pre-report TA at 412, the WTRU may wait for the time of the same-PCI satellite switch at 414. At the time of the same-PCI satellite switch, determined at 414, the WTRU may apply the pre-calculated TA to the new satellite at 416. The WTRU may apply a new timing advance at or during the time of satellite switch. At 418, OffsetThresholdTA may be configured. If OffsetThresholdTA is configured (e.g., determined at 418), the WTRU may ignore a trigger to report a TA if that TA had been pre-reported. For example, at 420, the WTRU may determine that the TA was successfully pre-reported, and ignore the trigger at 422. If the TA was not determined to have been pre-reported at 420, the WTRU may transmit a TAR at 424.

In examples, the WTRU may perform one or more of the following to support time synchronization during same-PCI satellite switch. For example, the WTRU may receive (e.g., via broadcast) the time and position of an incoming satellite at time of same-PCI satellite switch. The WTRU may receive a configuration for pre-reporting timing advance to new satellite (pre-TAR). The configuration for pre-reporting timing advance may include one or more of: an enable/disable indication for pre-TAR reporting; an offset prior to the satellite switch time to report the pre-TAR; a time period to report the pre-TAR; and conditions to report the pre-TAR (e.g., a delta threshold from the timing advance to the former satellite). The WTRU may pre-calculate a timing advance value to the incoming satellite using the position of incoming satellite at time of PCI switch. The WTRU may transmit the pre-calculated TA value according to the pre-reporting configuration. In one or more cases, the pre-reporting configuration may explicitly indicate that the TA value is associated with the incoming satellite. The WTRU may apply the pre-calculated timing advance to the incoming satellite at time of same PCI satellite switch. For the cases in which the WTRU successfully reported the future timing advance prior to satellite switch (e.g., the WTRU receives an ACK to the transmission carrying the pre-TAR), the WTRU ignores the trigger condition based on offsetThresholdTA being configured and TAR being triggered due to satellite switch. For the cases in which the WTRU does not successfully report the future timing advance prior to satellite switch, the WTRU transmits a TAR at time of satellite switch using pre-calculated timing advance. In one or more cases, the WTRU transmits an UL TB using the pre-calculated timing advance.

A WTRU may be configured for RLM for a same-PCI satellite switch. In examples, for radio-link monitoring (RLM), the WTRU may average cell measurements over time to obtain L3 cell quality. After a same-PCI satellite switch, measurements and/or cell quality information associated with the former satellite may no longer be valid. This may result in a delay of radio issue detection for an incoming satellite after a satellite switch. The delayed detection may be partially resolved by acquiring many new measurements quickly after the satellite switch. Acquiring new measurements for an incoming satellite may require a measurement reconfiguration after the satellite switch. This process may take time, for example, considering WTRU-gNB RTT and risk of RLF. Methods and embodiments discussed herein may relate to RLM enhancements to address these issues, for example, delayed detection. For example, the WTRU may reset the L3 measurement window at the time of satellite switch, apply a pre-configured measurement configuration (e.g., with denser measurement objects), and/or filter coefficients to quickly assess new channel conditions.

The WTRU may be configured for measurement configuration after a same-PCI satellite switch. In examples, the WTRU may receive measurement configuration information to apply at the time of the same-PCI satellite switch. The measurement configuration may include, for example, a denser configuration of measurement objects to quickly acquire the channel conditions to the incoming satellite. In some examples, the measurement configuration may replace all or part of the current measurement configuration. For example, the WTRU may remove and/or reconfigure one or more aspects of the current configuration. In one or more instances, the new measurement configuration may add one or more additional measurement objects and/or identities to the current configuration. The new measurement configuration may modify (e.g., add/remove/reconfigure) other aspects of a measurement configuration such as, but not limited to, reporting configurations, quantity configurations, measurement gaps, and the like.

The WTRU may receive and store measurement configuration(s) prior to the same-PCI satellite switch. The measurement configuration(s) may optionally include a condition and/or indication that may be applied at the time of a same-PCI satellite switch. In examples, the WTRU may acquire the condition and/or indication, for example, via broadcasted same-PCI satellite switch assistance information. In examples, the measurement configuration may include an explicit "activation time", in which the measurement configuration explicitly includes the time to apply the measurement configuration. The WTRU may apply the new measurement configuration based on satisfaction of the condition (e.g. at activation time/time of same PCI switch).

The measurement configuration may include one or more expiry condition(s). Expiry condition(s) may be hereafter referred to as a "temporary measurement configuration". An expiry condition may be time-based. For example, the time-based expiry condition may be an explicit time. The time-based expiry condition may correspond to the end of a time period started upon application of the measurement configuration. An expiry condition may be based on a number of measured reference signals (e.g., SSB/CSI-RS) and/or measurement objects. An expiry condition may be based on a determination that a steady channel quality has been established. For example, the expiry condition may be based on metric of the channel quality such as, but not limited to, a measurement variance or standard deviation. An expiry condition may be based on the measurement value (e.g., the RSRP/RSRQ/SINR value) exceeding or falling below a threshold. An expiry condition may correspond to the activation of a second measurement configuration.

In one or more examples, the WTRU may apply subsequent measurement configuration(s) based on satisfaction of the expiry condition, for example, a second configuration. The second configuration may have been received prior to the satisfaction of the expiry condition, and may be stored by the WTRU. In examples, the second configuration may include an optional indication to apply the second configuration upon expiry of the first measurement configuration. In examples, the measurement configuration applied at the time of same-PCI satellite switch may include an indication to store the earlier measurement configuration. For example, the indication to store the earlier measurement configuration may correspond to the configuration prior to the same-PCI satellite switch. In examples, the WTRU may revert to the earlier measurement configuration based on satisfaction of one or more of the expiry conditions.

The WTRU may be configured for L3 filtering after a same-PCI switch. In examples, the WTRU may reset the L3 measurement window based on a same-PCI satellite switch. The WTRU may reset the L3 measurement window to avoid detection of poor channel conditions due to, for example, averaging out measurements to the incoming satellite with measurements from the former satellite in a same-PCI satellite switch. In examples, the WTRU may discard one or more measurements associated with the previous satellite. For example, the WTRU may consider channel and/or cell quality derivations (e.g., RSRP/RSRP/SINR), including one or more measurements associated with the former satellite, as being invalid. An invalid measurement result may, for example, be discarded, not used for event evaluation, cell (re)selection or mobility decision, and/or not included in a measurement report.

The WTRU may receive a new or revised set of L3 filtering coefficients. For example, the WTRU may receive the new or revised set of L3 filtering coefficients to apply at the time of same PCI satellite switch. In some cases, the filtering coefficients may be provided and stored along with the measurement configuration(s) discussed herein. In some cases, the filtering coefficients may be received independently. Similar to the temporary measurement configuration, the set of L3 filter coefficients may be associated with one or more of: an activation condition; an expiry condition; an indication to store the previous set of L3 filter coefficients to be used upon expiry; and a second set of L3 filter coefficients to be applied after expiry of the temporary L3 filter coefficients.

The WTRU may be configured for measurement reporting prior to and/or after a same-PCI satellite switch. To avoid reporting measurements which will shortly become invalid, or to avoid triggering a measurement report prior to acquisition of the channel quality to new cell, the WTRU may suspend measurement reporting at, or prior to, a same-PCI satellite switch. In some cases, the WTRU may determine whether to suspend measurement reporting prior to a satellite switch based on an explicit configuration from the network. In other cases, the WTRU may determine whether to suspend measurement reporting prior to a satellite switch based on an explicit configuration broadcast in system information (e.g., within same-PCI satellite switch assistance information). Within the suspension configuration and/or indication, the WTRU may receive one or more of: condition(s) to start suspending measurement reporting; condition(s) to resume measurement reporting; aspects of measurement reporting the suspension applies to (e.g., a subset of events, the reporting type etc.); and exceptions to measurement reporting suspension.

The WTRU determine when to start measurement reporting suspension based on time. For example, the WTRU may suspend measurement reporting at the time of the same-PCI satellite switch. In some cases, the start time may occur at an offset from the same-PCI satellite switch (e.g., 10s prior to switch) or an explicit time (e.g., 10:30:02 UTC time). In one or more cases, the network may optionally provide a time period/duration in which measurement reporting is suspended and may be maintained by the WTRU (e.g., via a prohibit timer).

In examples, the suspension may apply to one or more aspects of measurement reporting. For example, the suspension may apply to event-triggered measurement reporting, periodic measurement reporting, or both. In examples, the suspension may apply to a subset of measurement events (e.g., measurement reports triggered by A3 are suspended). In examples, the suspension may apply to a measurement report triggered by measurements performed on one or more cells or measurement objects/IDs. In some cases, the suspension may be overridden, for example, based on more than one event-based measurement trigger being satisfied; based on specific event-based triggers being satisfied; and/or to support recovery procedures, such as radio link failure.

The WTRU may resume measurement reporting based on one or more of the following examples. The WTRU may resume measurement reporting, for example, based on expiry of a temporary measurement configuration. The WTRU may resume measurement reporting, for example, based on reconfiguration of a measurement configuration. The WTRU may resume measurement reporting, for example, based on activation of a second measurement configuration. The WTRU may resume measurement reporting, for example, based on satisfaction of a measurement-based condition (e.g., RSRP/RSRP/SINR exceeds or falls below some threshold). The WTRU may resume measurement reporting, for example, after a time duration. The WTRU may resume measurement reporting, for example, based on reaching an absolute time.

The WTRU may be configured with an association between measurement reporting and ephemeris information. The WTRU may be configured with one or more ephemeris information for one or more satellites for a same-PCI satellite switch. The WTRU may perform L3 filtering of a measurement when the associated satellite location changes within a certain threshold. For example, when the associated satellite location change is greater than a threshold, the WTRU may reset L3 filter and start L3 filtering of a measurement. In examples, the satellite location change may be determined based on an ephemeris identity associated with a measurement. For example, the WTRU may be provided with one or more ephemeris, and each ephemeris may be associated with an identity. The identity may indicate which ephemeris-id is active, and/or which ephemeris-id will be active from which starting time (e.g., associated with incoming satellite). In one or more cases, the satellite location change may be determined based on AoD of a beam at the satellite. For example, a L3 filtering reset for a measurement may be triggered when the AoD of a beam (e.g., serving beam) change is larger than a threshold. In one or more cases, the length of L3 filter may be determined based on one or more parameters of ephemeris information. For example, for the cases in which the satellite speed is higher than a threshold, a first L3 filter length may be used. For the cases in which the satellite speed is lower than the threshold, a second L3 filter length may be used, in which the first L3 filter length may be shorter than the second L3 filter length.

In one or more examples, the WTRU may reset a measurement window at time of satellite switch to avoid channel conditions to new satellite being averaged out. The WTRU may apply a new measurement configuration, such as a temporary configuration with a denser set of measurement objects. The WTRU may filter coefficients after a satellite switch to quickly acquire measurements and re-sync to new satellite. The WTRU may temporarily suspend L3 event-based reporting an offset prior to satellite switch (if channel conditions are about to change, no need to use resources to report a cell no longer available) and/or after the satellite switch (to allow time to properly measure new channel conditions) to avoid unnecessary reporting. The WTRU may, for example, temporarily suspend L3 event-based reporting some offset prior to satellite switch for the cases in which channel conditions are about to change, and there is no need to use resources to report a cell no longer available. The WTRU may, for example, temporarily suspend L3 event-based reporting an offset after the satellite switch to allow time to properly measure new channel conditions to avoid unnecessary reporting.

Figure 5:
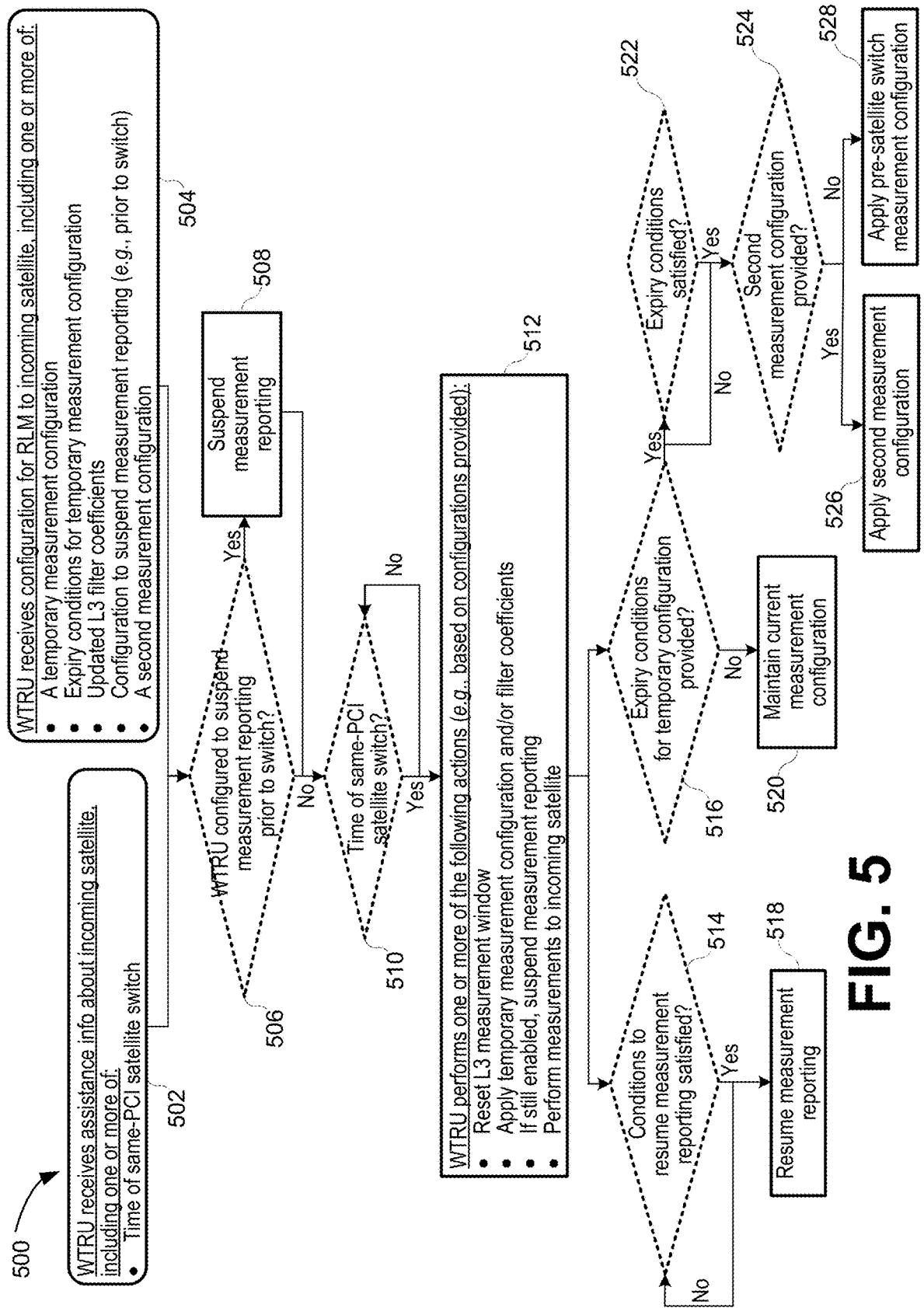
FIG. 5 is a flowchart illustrating an example radio link monitoring during a same-PCI satellite switch.

FIG. 5 is a flowchart illustrating a process 500 of an example radio link monitoring during a same-PCI satellite switch. The WTRU may perform one or more of the following to support RLM during same-PCI satellite switch. At 502, the WTRU may receive assistance information about the incoming satellite. For example, the WTRU may receive (e.g., via broadcast) the time a same-PCI satellite switch will occur. At 504, the WTRU may receive configuration information for RLM for the incoming satellite. The WTRU may receive a measurement configuration to apply at time of same PCI satellite switch. The measurement configuration may include, for example, but not limited to, one or more of: a temporary measurement configuration; expiry conditions for temporary measurement configuration (e.g., number of measured RSs, time duration etc.); a second measurement configuration (e.g., to apply after temporary measurement configuration); L3 filter coefficients to apply at the time of satellite switch; and a configuration to suspend measurement reporting, including one or more of: a start time and duration.

The WTRU may determine to suspend measurement reporting based on the configuration information at 506. For example, if configured to suspend reporting prior to the same-PCI satellite switch, the WTRU may suspend measurement reporting at 508. At 510, based on the received configuration information, the WTRU may wait for the start time of the same-PCI satellite switch. At 512 (e.g., the time of the same-PCI satellite switch), the WTRU may perform one or more of the following actions based on the received configuration information: reset L3 measurement window; apply temporary measurement configuration and/or filter coefficients; if still enabled, suspend measurement reporting; and/or perform measurements to incoming satellite.

At 514, the WTRU may determine that the conditions to resume measurement reporting have been satisfied, and resume measurement reporting at 518. At 516, the WTRU may determine whether expiry conditions have been provided. If no expiry conditions for the temporary measurement configuration have been provided, the WTRU may continue to perform measurements according to the temporary measurement configuration at 520. At 522, the WTRU may determine whether the expiry conditions for temporary measurement configuration have been satisfied. For the cases in which the expiry conditions for temporary measurement configuration are not satisfied (or not configured), the WTRU may perform measurements according to the temporary measurement configuration and filter based on updated L3 filter coefficients. In examples, the WTRU may receive a second measurement configuration at 524. For the cases in which the expiry conditions for the temporary measurement configuration are satisfied, and the WTRU has received a second measurement configuration, the WTRU may apply the second measurement configuration at 526. For the cases in which the expiry conditions for the temporary measurement configuration are satisfied, and no second measurement configuration was received, the WTRU may determine at 524 to revert to the previous measurement configuration (e.g., used prior to satellite switch). For example, at 528, the WTRU may apply the prior (e.g., pre satellite switch) measurement configuration. In one or more cases, the WTRU may transmit a measurement report based on the new measurement configuration.

A WTRU may be configured for transmission handling for a same-PCI satellite switch. WTRU re-synchronization time for a same-PCI satellite switch may vary based on the WTRU's capability to determine, or pre-determine, aspects of synchronization (e.g. timing advance, power control, etc.). During re-synchronization, transmission and/or reception may be suspended. If the network is unaware of the WTRU's re-synchronization time, there may be associated risks. For example, there may be a risk of additional latency and wasted transmission opportunities (e.g., if re-synchronization time is over estimated), or missed TX and/or RX occasions (e.g., if re-synchronization time is under-estimated). Methods and embodiments discussed herein may relate to supporting proper resynchronization gap configuration and WTRU TX/RX handling. For example, the WTRU may send provide capability and/or assistance information regarding resync time to assist with resynchronization gap configuration and transmission handling during resync time.

The WTRU may be configured with assistance information for resynchronization of a gap configuration during a same-PCI satellite switch. The WTRU may be configured with a "resynchronization gap" to facilitate resynchronization to an incoming satellite during a same-PCI satellite switch. During a resynchronization gap, the WTRU may perform one or more resynchronization actions and/or procedures related to the incoming satellite. The resynchronization actions and/or procedures may include, for example, timing advance calculation, doppler compensation, power control, measurements/RLM, and/or beam management. During re-synchronization, the WTRU may suspend (or not be expected to perform) DL reception and/or UL transmission. The TX and/or RX suspension may include, for example, dynamic scheduling and preconfigured transmissions (e.g., configured grants, periodic CSI/SRS reporting, etc.).

The WTRU may provide assistance information (e.g., via MAC CE and/or RRC signalling) to support proper configuration of a resynchronization gap. WTRU assistance information for resynchronization gap configuration may include, for example, one or more of: a time to perform full resynchronization; a time to perform one or more aspects of resynchronization (e.g. timing synchronization, UL power control); a capability to perform one or more aspects of resynchronization prior to same-PCI satellite switch; an estimated time of resynchronization complete (e.g., 10:32:30:00 UTC); a determination of whether the WTRU may continue to receive/transmit during resynchronization time; an earliest time that the WTRU may resume transmission/reception (e.g., 10:32:40:00 UTC); measurements of neighbouring cells (e.g., in the case of fallback or RLF); and/or a determination of whether one or more pre-configured transmissions overlaps with the resynchronization gap.

The WTRU may provide assistance information (e.g., one or more of the above) for resynchronization gap configuration. For example, the WTRU may provide one or more of the above assistance information based on an explicit network request. In examples, the WTRU may provide assistance information (e.g., one or more of the above) for resynchronization gap configuration upon connection, or resumption of connection, to the network (e.g., during WTRU capability transfer). In examples, the WTRU may provide assistance information (e.g., one or more of the above) for resynchronization gap configuration within the WTRU assistance information (UAI) message. In examples, the WTRU may provide assistance information (e.g., one or more of the above) for resynchronization gap configuration within the "WTRU Information Response" message (e.g., based on a request or indication within the "WTRU Information Request" message sent by the network).

The WTRU may determine to transmit assistance information for resynchronization gap configuration transmission based on configured conditions. For example, the WTRU may determine to send assistance information based on variation between the current state of one or more information fields and/or the previously reported information. This variation, between the current state of one or more information fields and the previously reported information, may be, for example, any amount of variation. In examples, the WTRU may determine to send assistance information based on the variation exceeding a configured threshold. In examples, the WTRU may determine to send assistance information at a configured time (e.g., an absolute time, offset, time period) prior to the same-PCI satellite switch. To assist with reliability, the WTRU may transmit assistance information on HARQ processes when HARQ feedback/retransmission is configured (e.g., HARQ mode A).

The WTRU may receive configuration information for resynchronization gap configuration. The WTRU may perform actions during the resynchronization gap based on the received configuration information. In examples, the WTRU may receive resynchronization gap via MAC CE and/or broadcast signalling. In examples, the resynchronization gap may be directly configured via RRC signalling.

The configuration information (e.g., resynchronization gap configuration information) may include one or more of the following: a start time of a resynchronization gap; an end time of the resynchronization gap; a resynchronization gap duration; a determination of whether to suspend one, more, or all UL transmission/DL reception during resynchronization (e.g., the network may indicate that one or more transmission/reception types such as periodic scheduling is suspended, but others like dynamic scheduling are still enabled); a determination of which resynchronization procedures to perform prior to the resynchronization (e.g., timing advance pre-calculation/reporting); a determination of which resynchronization aspects to perform during the resynchronization gap; and/or information and/or configurations to perform one or more resynchronization procedures. The configuration information comprising a start time of a resynchronization gap may, for example, indicate that the resynchronization gap starts at the same-PCI satellite switch time, or at some other occasion. For example, the configuration information comprising a start time and a resynchronization gap duration may indicate the expected end time of the same-PCI satellite switch. For example, the configuration information comprising a start time and an end time of the resynchronization gap may indicate the expected duration of the same-PCI satellite switch.

In some cases, the WTRU may select, request, or suggest a resynchronization gap configuration (e.g., via the contents of the WTRU assistance information). The network may provide an acknowledgement to the requested configuration. In some cases, the network may preconfigure, broadcast, or indicate a set of candidate resynchronization gap configurations. For example, the network may indicate a resynchronization gap configuration by transmitting and indicating an index corresponding to a configuration.

The WTRU may apply the resynchronization gap configuration for the same-PCI satellite switch. In examples, the resynchronization gap configuration may be applied to one or more future satellite switch events. In examples, the WTRU may determine whether to store and/or maintain the current resynchronization gap configuration (e.g., to be used in subsequent same-PCI satellite switch events) based on an indication (e.g., an explicit indication) and/or configuration. In examples, the WTRU may apply the same gap configuration for subsequent same-PCI satellite switch(es) until the configuration is deactivated, and/or a revised resynchronization gap configuration is received.

In one or more cases, to support resynchronization gap configuration, the WTRU may send capability and/or assistance information (e.g., estimated re-synchronization time) prior to the satellite switch. Prior to the same-PCI satellite switch, the WTRU may receive configuration information for a resynchronization gap. The configuration information for the resynchronization gap may include, for example, an indication of a start time, an end time, and/or a duration of the resynchronization gap. At the time of the same-PCI satellite switch, the WTRU may start the resynchronization gap. In examples, the WTRU may start the resynchronization gap at an offset from the same-PCI satellite switch (e.g., based on an indication within the configuration). While the gap is ongoing, the WTRU may suspend TX and/or RX. In some cases, the WTRU may suspend pre-scheduled transmissions such as, for example, configured grants, periodic CSI/SRS, and the like. The WTRU may signal that the synchronization is completed via transmission of a UL signal, for example, but not limited to, a SR, transmission on CG, PRACH, HARQ ACK, and the like.

Figure 6:
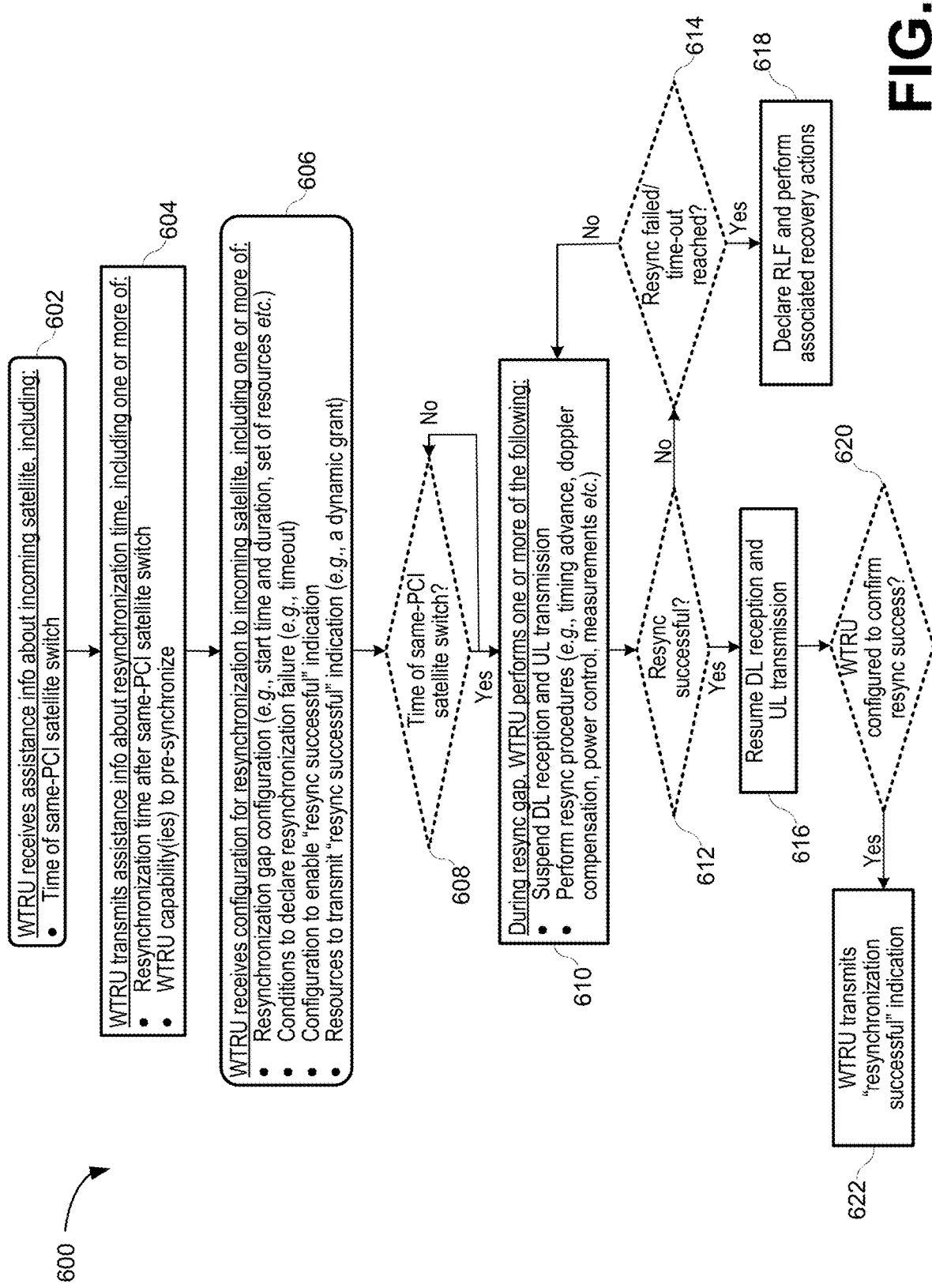
FIG. 6 is a flowchart illustrating an example transmission handling and measurement gap configuration during a same-PCI satellite switch.

FIG. 6 is a flowchart illustrating a process 600 of an example transmission handling and measurement gap configuration during a same-PCI satellite switch. In one or more cases, the WTRU may perform one or more of the following steps to support transmission handling and measurement gap configuration during same-PCI satellite switch. At 602, the WTRU may receive assistance information associated with the incoming satellite. For example, the WTRU may receive (e.g., via broadcast) the time a same-PCI satellite switch will occur. Prior to same PCI satellite switch, at 604, the WTRU may transmit assistance information. The assistance information may include one or more of: a re-synchronization duration; an ability of the WTRU to perform synchronization procedures (e.g. timing advance pre-calculation and reporting) prior to same-PCI satellite switch; and/or a determination of when the WTRU can resume RX/TX after same-PCI satellite switch. At 606, the WTRU may receive configuration information for satellite re-synchronization. The configuration information for satellite re-synchronization may include one or more of: a configuration information for a resynchronization gap; conditions to declare resynchronization failure; and/or resources (e.g., an UL grant, dedicated RACH preamble, and the like) to indicate successful re-synchronization.

Based on the configuration and/or assistance information, at 608, the WTRU may wait for the same-PCI satellite switch to occur. At 610, the time of the satellite switch, the WTRU may start the resynchronization gap and suspend UL transmission and/or DL reception. At 610, the WTRU may perform one or more re-synchronization procedures for the incoming satellite (e.g., timing advance calculation, doppler compensation, power control, measurements). At 612, the WTRU may be successful in resynchronizing to the satellite. In the case of successful re-synchronization, the WTRU may resume DL reception and UL transmission at 616. If, at 620, the WTRU is configured to confirm or indicate resync success, the WTRU may transmit a resynchronization successful indication (e.g., using provided resources). At 612, the WTRU may be unsuccessful in resynchronizing to the satellite. At 614, the WTRU may time out and determine that there was unsuccessful resync. If the timeout has not been reached, the WTRU may continue to perform the resynchronization gap procedures at 610 based on the configuration. At 614, the WTRU may determine that there was unsuccessful resync, and if the timeout has been reached, the WTRU may declare RLF and perform associated recovery actions at 618.

In one or more cases, the WTRU may be configured for power control during a same PCI satellite switch. The required UL TX power after a satellite switch may vary significantly due to the large difference in location between former and incoming satellites. If the WTRU relies on legacy closed loop power control (i.e., the WTRU waits until power control command is received after satellite switch) to adjust UL transmission power, the WTRU may risk a failed transmission if initial transmit power is too low or interference. Additionally, the WTRU may risk excess power consumption if initial transmit power is too high. Embodiments described herein relate to supporting power control during same-PCI satellite switch. Further, embodiments provide processes for the WTRU to adjust power for initial UL transmission to a new satellite based on difference in distance between the WTRU and old and new satellite.

A WTRU may be configured for autonomous TX power adjustment during same-PCI satellite switch. The WTRU may adjust the power to the incoming satellite after a same-PCI satellite switch. For example, the WTRU may adjust the power to the incoming satellite after a same-PCI satellite switch to avoid using too much or too little UL power for an initial transmission. The ability for the WTRU to autonomously adjust the transmission power may be enabled/disabled by the network. For example, the network may enable/disable the ability for the WTRU to autonomously adjust the transmission power via an RRC configuration or indication, such as, but not limited to broadcast signalling in SIB, MAC CE, and/or DCI. The network may provide additional information/configuration(s) to calculate the initial UL TX power to the incoming satellite. The additional information/configuration(s) may include one or more of: a maximum delta value of the original TX power that can be autonomously adjusted by the WTRU; a maximum and/or minimum absolute TX power; a mapping between distance and power adjustment (e.g., 100 km=1 dB); a mapping between distance and a scaling coefficient (e.g., 100 km=1.25×); a determination of how to adjust the TX power (e.g., scaling by a factor, adding/subtracting power); a determination of whether to scale the total transmission power or one or more components of the transmission power (e.g., the pathloss); assistance information corresponding to the transmission characteristics of the incoming satellite (e.g., antenna gain); and a free-space coefficient to apply for calculating the change in pathloss.

In examples, WTRU may autonomously adjust the transmission power. For instance, the WTRU may autonomously adjust the transmission power based on satisfaction of one or more conditions. For example, the WTRU may calculate the line-of-sight probability to the former and incoming satellite. If the line-of-sight probability (e.g., LOSPI) to the former satellite, incoming satellite, or both satellites is below a configured threshold (e.g., 95%), then the WTRU may not autonomously adjust transmission power. In some cases, the network may provide one threshold to be used for LOS evaluation for both incoming and former satellites. In some cases, the network may provide a threshold for each satellite.

The WTRU may evaluate and/or determine incoming satellite pathloss during a same-PCI satellite switch. In examples, to support WTRU autonomous power adjustment, the WTRU may use assistance information corresponding to the incoming satellite to determine the location of the satellite at the time of same PCI satellite switch. The assistance information may be, for example, the explicit position of the satellite at the time of same-PCI satellite switch. In examples, the WTRU may use ephemeris data of incoming satellite to predict the location of satellite at the time of same-PCI satellite switch. The WTRU may acquire the location of the WTRU (e.g., via GNSS) and calculate the distance between the WTRU and incoming satellite at time of same-PCI satellite switch. The WTRU may use a similar set of procedures to determine the location of the former satellite (e.g., at time of same-PCI satellite switch).

For the cases in which the WTRU is configured with a line-of-sight condition, the WTRU may calculate the line-of sight probability (LOSPI) to the former and/or incoming satellite. Whether the WTRU calculates the line-of-sight probability for one or both satellite(s) may depend on whether the condition requires a LOSPI evaluation for one or both satellite(s). The WTRU may calculate the line-of-sight probability, for example, using assistance information related to each satellite (e.g., location, ephemeris data, orbital characteristics) and/or reference signals (e.g., SSB, CSI-RS, PRS). The WTRU may receive and/or evaluate reference signals from the incoming satellite, for example, via measurements on one or more neighbouring cells, which originate from the incoming satellite.

In some examples, the LOSPI may be evaluated by the network. In such cases, the WTRU may provide the WTRU location (e.g., current location, or estimated location at time of same-PCI satellite switch). The network may provide a LOSPI associated with one or both satellites (e.g., at the time of same-PCI satellite switch) to be used in the conditional evaluation. In one or more other cases, the LOSPI indication may be directly evaluated by the network. The LOSPI indication evaluation may be used to enable/disable WTRU-autonomous power adjustment.

In some examples, the WTRU may be configured for autonomous UL TX power adjustment during a same-PCI satellite switch. At the time of the same-PCI satellite switch (or at some point between same-PCI satellite switch and initial transmission to the incoming satellite), the WTRU may determine autonomous transmission power adjustment is enabled and configured. If any necessary or configured conditions are satisfied (e.g., based on line-of-sight probability), the WTRU may adjust the transmission power for the initial transmission. If WTRU autonomous power adjustment is disabled/deactivated, or autonomous power adjustment is enabled and one or more conditions are not satisfied, the WTRU may use the transmission power from the former satellite for initial transmission to the incoming satellite.

The WTRU autonomous power adjustment may be based on one or more of: the distance(s) between the WTRU and incoming satellite and/or former satellite; the delta different between the WTRU-former satellite and WTRU-incoming satellite); a determination of how the WTRU adjusts the power (e.g., whether the WTRU adds/subtracts power and/or applies a scaling coefficient); a mapping or relationship between the distances and the determination as to how the power is adjusted; maximum absolute (or delta) values of the original power that may be modified by the WTRU; transmission characteristics of the incoming satellite (e.g., antenna gain); and/or a total transmission power by the WTRU.

In one or more cases, the WTRU may calculate the delta distance between the WTRU and the incoming and former satellite. By applying a mapping of delta-distance to delta-dB provided by the network, the WTRU may determine an amount (e.g., in dB) to adjust the power. The WTRU may adjust the total transmission power or may adjust one or more components of the power calculation (e.g., the pathloss value) based on configuration. For the cases in which the delta power adjustment exceeds a maximum/minimum allowable power adjustment, the WTRU may select the boundary value. For the cases in which the adjusted value exceeds the total maximum allowable transmission power by the WTRU, the WTRU may select the maximum allowable transmission power. The WTRU may apply the scaled power for the initial transmission to the incoming satellite after same-PCI satellite switch. In one or more cases, the WTRU may use the delta distance and apply a free-space propagation loss coefficient to determine the change in pathloss between the incoming and former satellite. The WTRU may adjust the transmission power accordingly to compensate for the adjusted pathloss.

In one or more cases, the WTRU may indicate characteristics of the WTRU autonomous power adjustment based on an indication or configuration. For example, the WTRU may indicate (e.g., via MAC CE or RRC signaling) a determination of how much the WTRU has adjusted the UL TX power and/or the UL TX power level (e.g., within the first transmission). In some cases, the configuration/request may include resources (e.g., a dynamic UL grant) to send the indication. In other cases, the configuration/request may instruct the WTRU to include the indication in the initial transmission to the incoming satellite.

In one or more cases, the WTRU may adjust the UL transmission power for the initial transmission to the new satellite based on the delta-distance from the former satellite. The UL transmission power may be additionally controlled by the network configuration. For example, the network configuration may enable/disable the UL transmission power. In another example, the network configuration may provide the maximum allowed delta scaling for the UL transmission. In one or more cases, the UL transmission power may be subject to conditions, for example, but not limited to, the probability of line of sight to former and current satellite LOSPI is above a configured threshold.

Figure 7:
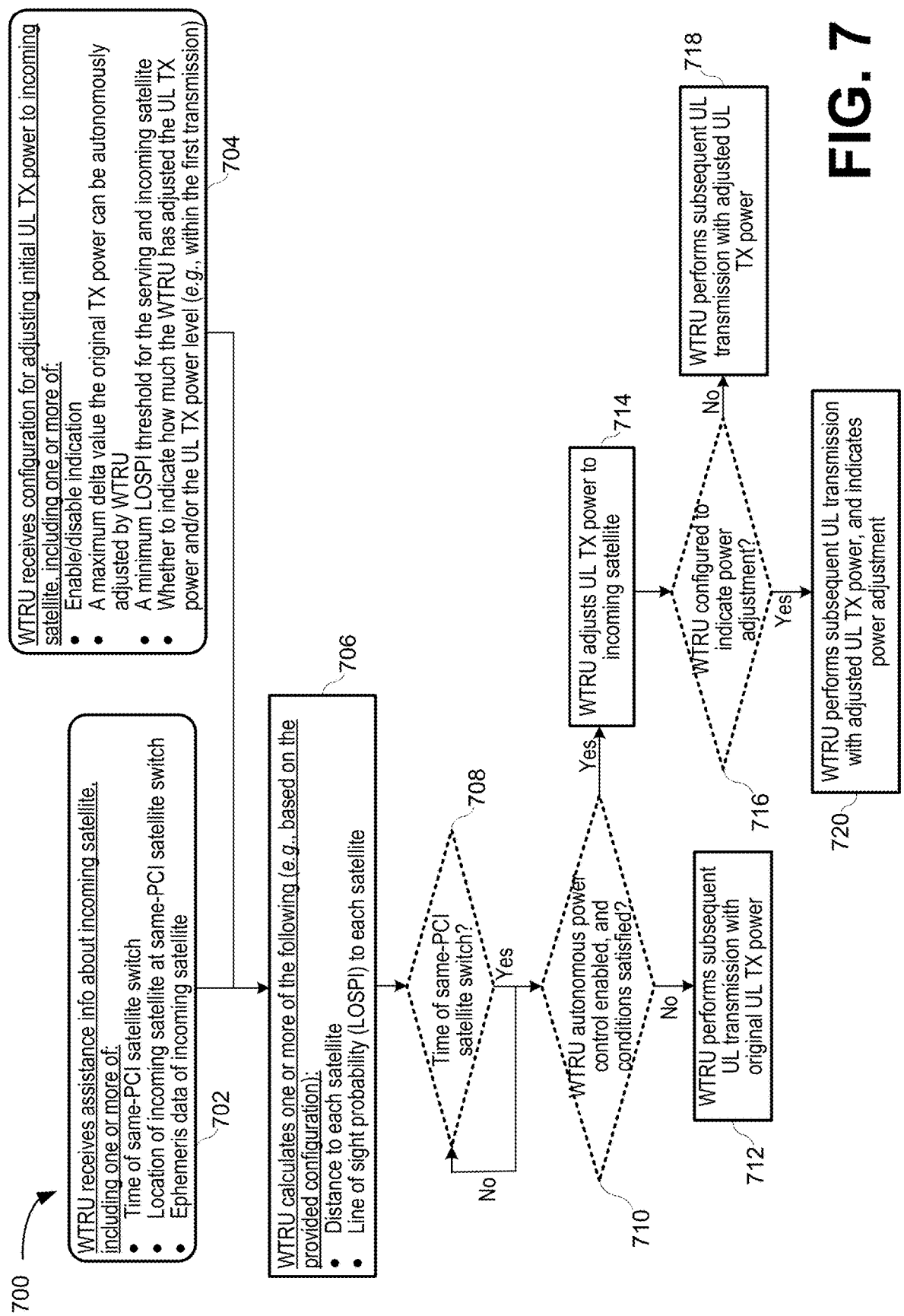
FIG. 7 is a flowchart illustrating an example power control during a same-PCI satellite switch.

FIG. 7 is a flowchart illustrating a process of an example power control during a same-PCI satellite switch. In one or more cases, the WTRU may perform one or more of the following steps to support power control during same-PCI satellite switch. At 702, the WTRU may receive (e.g., via broadcast) assistance information for the former and incoming satellite. The assistance information may include one or more of: ephemeris data of the current serving satellite; a time of the same-PCI satellite switch; and/or a position of incoming satellite at time of same-PCI satellite switch. At 704, the WTRU may receive configuration information for calculating the UL TX power to the incoming satellite. The configuration may include one or more of: an enable/disable indication, a maximum delta value in which the original TX power can be autonomously adjusted by WTRU; a minimum line-of-sight probability threshold for the former and incoming satellite; and/or a determination of whether to indicate how much the WTRU has adjusted the UL TX power and/or the UL TX power level (e.g., within the first transmission). The WTRU may acquire updated WTRU information (e.g., via GNSS).

At 706, the WTRU may calculate one or more of the following: the WTRU-to-satellite distance to each satellite at the time of same-PCI satellite switch (e.g., using the satellite assistance information); and/or the line-of-sight probability to each satellite. The WTRU may acquire updated WTRU information (e.g., via GNSS). At 708, the WTRU may identify the start of the same-PCI satellite switch. At 710, if WTRU autonomous UL TX power adjustment is not enabled, the WTRU may perform any UL transmissions using the original UL TX power at 712. At 710, if WTRU autonomous UL TX power adjustment is enabled, the WTRU may adjust the UL TX power to the incoming satellite. At 714, for the cases in which the WTRU autonomous UL TX power adjustment is enabled and line-of-sight conditions to the former and incoming satellite have been satisfied, the WTRU may adjust the UL TX power (e.g., proportional to the relative distance between the two satellites). The WTRU may transmit an initial UL transmission with the adjusted UL TX power. The WTRU may include the delta adjustment and/or current UL TX power in initial transmission if configured by NW. Upon same PCI satellite switch, for the cases in which the WTRU autonomous UL TX power adjustment is not enabled and/or Line-of-sight conditions to the former and incoming satellite have been satisfied, the WTRU transmits an initial UL transmission with the UL TX power used for transmission to the former satellite. The WTRU may be configured to indicate the determined power adjustment at 716. If the WTRU is not configured to indicate the adjustment, subsequent UL transmissions may be performed using the adjusted power at 718. If the WTRU is configured to indicate the adjustment, subsequent UL transmissions may be performed using the adjusted power at 720, and the WTRU may indicate the power adjustment (e.g., in the transmission).

A WTRU may be configured to perform beam management during a same PCI satellite switch. The serving and incoming satellite during a same-PCI satellite switch may be in very different locations. As such, the WTRU may need to re-orient it's UL TX beam post satellite switch. In one or more cases, relying on legacy methods to re-orient spatial filters until after satellite switch event may occur after a satellite switch. However, re-orienting spatial filters after the satellite switch event may increase re-synchronization time and thus service interruption. Embodiments described herein relate to supporting proper measurement gap configuration and WTRU TX/RX handling.

The WTRU may measure reference signals from the incoming satellite (e.g., some SSB/CSI-RS from a neighboring cell) to understand how to re-orient spatial filters when new satellite takes over coverage. The WTRU may receive an indication/configuration of the reference signal in a first time period (i.e., pre-switch) is QCL with a second reference signal in second time period (i.e., post switch) to link measurements between cells.

In one or more cases, the WTRU may be configured with an indication and/or configuration of a QCL relationship pre/post same-PCI satellite switch. The WTRU may be provided with a QCL relationship between one or more reference signal(s) originating from the incoming satellite and reference signals associated to the serving cell. The relationship between one or more reference signal(s) originating from the incoming satellite and reference signals associated to the serving cell may be time dependent, in which the WTRU assumes that the relationship between reference signal(s) (e.g., from neighbouring cells originating from the incoming satellite) is valid after the same-PCI satellite switch (e.g., where the current serving cell is served by the same satellite as the neighbouring cells indicated in the mapping relationship).

In examples, the WTRU may receive an indication and/or configuration that a first reference signal from a first time period (e.g., a reference signal from a neighbouring cell originating from the incoming satellite prior to same-PCI satellite switch) is QCL with a second reference signal from a second time period (e.g., a reference signal in the current serving cell after the same-PCI satellite switch). The WTRU may link measurements made in the first time period to support resynchronization (e.g., determination of spatial filters, pathloss estimation etc.) after the same-PCI satellite switch. The configuration of the first or second reference signals may include, for example, the identity of a SSB including at least physical cell identity (PCI) and SSB index, and/or the identity of a CSI-RS resource. For the cases in which the second reference signal is a SSB, the WTRU may determine that the corresponding PCI is the one corresponding to the serving cell.

In examples, the WTRU may be configured for beam management at the time of the same-PCI satellite switch. Prior to the same-PCI satellite switch, the WTRU may perform measurements on reference signals originating from the incoming satellite indicated in the mapping relationship. The WTRU may use these measurements to determine transmission aspects to apply to the serving cell after the same-PCI satellite switch, such as the spatial filter, L3 measurements, and DL pathloss. At the time of the same-PCI satellite switch, the WTRU may link measurements from these reference signals to the current serving cell. The WTRU may apply the transmission aspects for subsequent UL transmissions to the incoming satellite.

In examples, the WTRU may be configured to filter samples before and after PCI switch for L3 reporting. In another example, the WTRU may utilize the latest layer 3-filtered measurement result from first reference signal of a first time period (e.g., before a same-PCI satellite switch time) to combine the latest layer 3-filtered measurement result with the first measurement result from second reference signal of a second time period (e.g., after a same-PCI satellite switch time) and to obtain an updated filtered measurement result applicable to the second reference signal. The WTRU may utilize the updated filtered measurement result for further layer-3 filtering with subsequent measurement results, measurement reporting, and determination of RSRP for path loss estimation and uplink power.

The WTRU may be configured to determine a spatial RX beam based on a serving satellite location. In one or more cases, for a given TCI state (e.g., beam reference signal to indicate Rx beam at the WTRU), the WTRU may use, determine, or select an RX beam based on satellite location. For example, the WTRU may use a first RX beam when a serving satellite is in a first location and the WTRU may use a second RX beam when a serving satellite is in a second location and so forth. The WTRU may estimate satellite location based on ephemeris information (e.g., a first type of ephemeris information and/or a second type of ephemeris information). In one or more cases, the WTRU may reset L3 filter of a measurement when an RX beam is changed. In one or more cases, the WTRU may report RX beam information to the gNB when Rx beam is changed.

The WTRU may re-orient spatial filter(s) by using a reference signal from a neighboring cell (e.g., SSB/CSI-RS) that originates from the satellite that will eventually take over the PCI. To support this mapping, the WTRU may receive an indication/configuration that a reference signal in a first time period (i.e., prior to satellite switch) is QCL with a second reference signal in second time period (i.e., after satellite switch). As such, whatever was measured from one satellite can be linked to a second incoming satellite.

Figure 8:
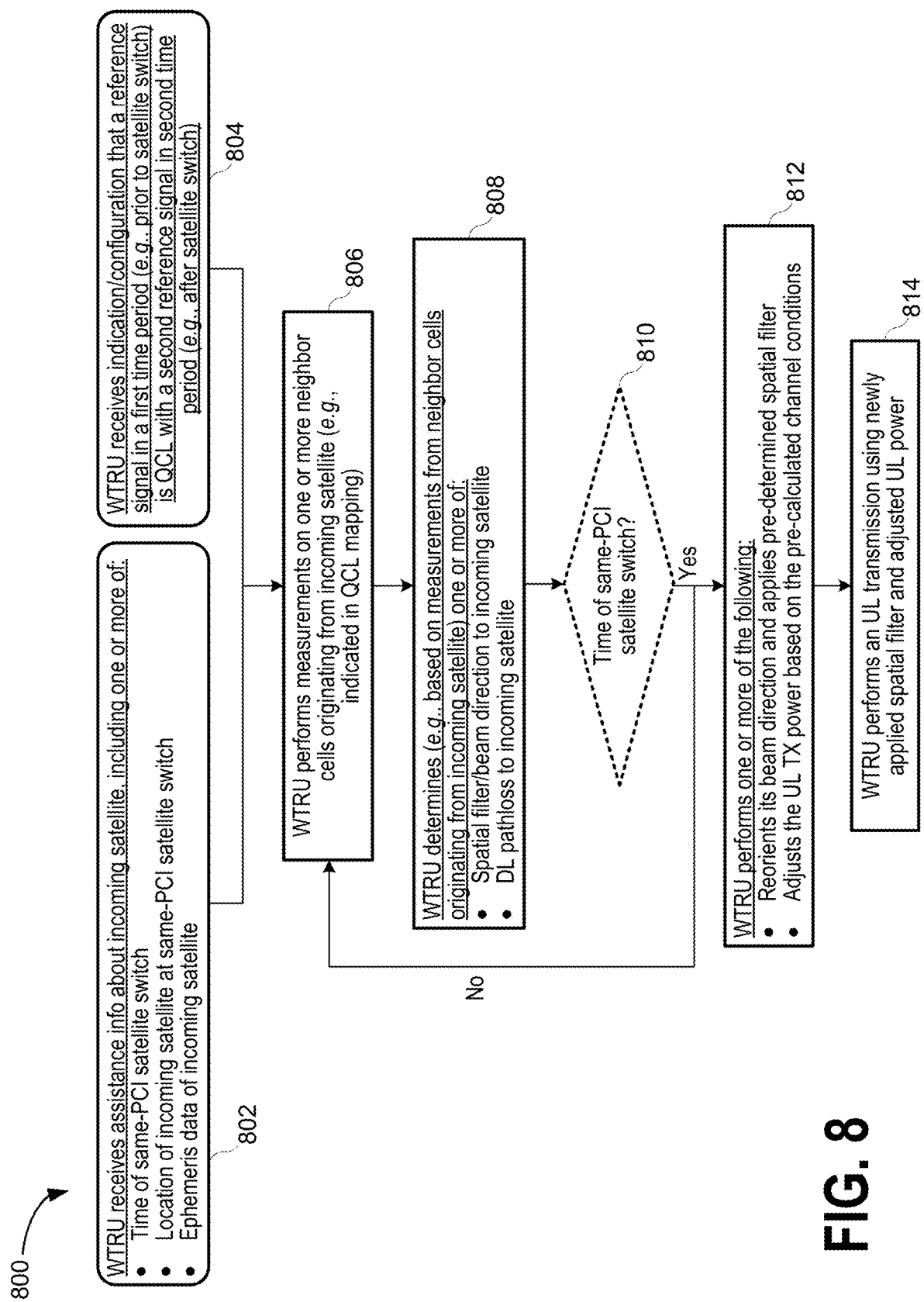
FIG. 8 is a flowchart illustrating an example of beam management during a same-PCI satellite switch.

FIG. 8 is a flowchart illustrating a process 800 of an example of beam management during a same-PCI satellite switch. In one or more cases, the WTRU may perform one or more of the following steps to support beam management during same-PCI satellite switch. At 802, the WTRU may receive (e.g., via broadcast) assistance information about the incoming satellite. The assistance information may comprise, for example, a time indication of the same-PCI satellite switch, the location of the incoming satellite, and/or ephemeris data of the incoming satellite. At 804, the WTRU may receive an indication/configuration that a reference signal in a first time period (e.g., prior to satellite switch) is quasi-collocated (QCL) with a second reference signal in second time period (e.g., after satellite switch).

At 806, the WTRU may measure reference signals originating from the incoming satellite during the first time period. At 808, the WTRU may calculate, based on the information obtained at 806, the beam direction and/or DL pathloss to the incoming satellite using reference signals from the first time period.

At 810, the time of same-PCI satellite switch, WTRU may perform actions associated with the satellite switch. At 812, based on the mapping configuration and reference signal measurements from the first time period, the WTRU may re-orient the UL TX beam of the WTRU (e.g., via application of an updated spatial filter) and adjust the transmit power for initial UL transmission (e.g., based on the measured DL pathloss from the first period). The WTRU may link measurements from the first time period to measurements in the second time period. At 814, the WTRU may perform an UL transmission using the newly applied spatial filter and adjusted UL power. The WTRU may transmit same-PCI satellite switch confirmation (e.g. using MAC CE or pre-configured PUCCH) using the determined UL Tx beam and transmission power calculated based on RSRP of the reference signal during first time period.

In one or more cases, the WTRU may be configured with an acknowledgment of a resynchronization complete after a same-PCI switch. The WTRU may be configured/requested/indicated to provide an indication or acknowledgment that the WTRU has regained synchronization to the incoming satellite after a same-PCI satellite switch. The resynchronization indication may be an explicit indication confirming that the WTRU has regained full synchronization or may indicate that one or more aspects of synchronization are regained. In one or more cases, the acknowledgment may not reference an aspect of resynchronization, but may indicate that the WTRU can transmit and receive data from the incoming satellite. In one or more other cases, the acknowledgment may be implicit, for example, based on successful WTRU transmission to an incoming satellite on some occasion after a same-PCI satellite switch.

In one or more cases, the WTRU may send the indication via, for example, but not limited to, MAC CE, RRC signalling, UCI, RACH signalling (MSA, MSG3, MSG5), and/or a PUSCH transmission. The WTRU may be provided with dedicated resources (e.g., an UL grant, dedicated RACH preamble, specific RNTIs) to indicate successful re-synchronization, in which upon reception of a transmission using the dedicated resources the network may assume that resynchronization is successful. The WTRU may include additional assistance information related to one or more resynchronization procedures. The additional assistance information may include one or more of: the timing advance, power information, measurement results, and/or beam information (e.g., as described herein).

In one or more cases, the WTRU may send the first transmission to an incoming satellite after a same-PCI satellite switch on HARQ processes that are configured with reliability (e.g., on HARQ processes configured with HARQ Mode A). In some cases, the WTRU may expect the first reception from an incoming satellite to be received on a HARQ process with HARQ feedback configured.

In one or more cases, the WTRU may be configured with a declaration of a resynchronization failure. For the cases in which the WTRU is unable to complete resynchronizing to an incoming satellite, the WTRU may declare "resynchronization failure". For example, if the WTRU has not regained one or more aspects of synchronization (e.g., time, frequency, power, measurements) by the end of the resynchronization gap duration (or some other expiry time), the WTRU may declare resynchronization failure. In another example, if the WTRU has a scheduled DL reception or UL transmission to the incoming satellite (e.g., after the resynchronization gap) that the WTRU is unable to perform due to not having completed resynchronization, the WTRU may declare resynchronization failure.

The WTRU may declare resynchronization failure prior to the same-PCI satellite switch. For example, for the cases in which the WTRU was unable to receive the necessary information to perform resynchronization to the incoming satellite, the WTRU may declare resynchronization failure prior to the same-PCI satellite switch. In another example, if the connection with the former satellite is still ongoing, the WTRU may report resynchronization failure prior to a same-PCI satellite switch including one or more procedures that the WTRU is unable to complete, and/or the information the WTRU is unable to obtain.

In one or more cases, the WTRU may declare a partial resynchronization failure if one or more aspects of resynchronization are unsuccessful. For the cases of partial resynchronization failure, the WTRU may still resume RX/TX to the incoming satellite, however, with sub-optimal configuration (e.g., the wrong power). The WTRU may indicate that one or more aspects are unable to be completed or request necessary information to fix the issue.

Upon declaration of resynchronization failure (or partial resynchronization failure), the WTRU may perform one or more recovery actions. The one or more recovery actions may include, for example, but not limited to: beam failure recovery (BFR); radio link failure (RLF); timing advance pre-compensation; conditional handover; cell reselection; random access; apply an alternative measurement configuration; resume measurement reporting; and/or transition to RRC INACTIVE/IDLE.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
a processor configured to:
receive, via broadcast signaling, configuration information indicating a same-physical cell identity (PCI) satellite switch from a first satellite to a second satellite, wherein the configuration information comprises an indication of a start time and an indication of an end time for the same-PCI satellite switch from the first satellite to the second satellite;

start a resynchronization for the same-PCI satellite switch based on the configuration information;

suspend uplink transmission with the first satellite in response to the same-PCI satellite switch; and perform the same-PCI satellite switch to the second satellite based on the configuration information indicating the same-PCI satellite switch.

2. The WTRU of claim 1, wherein the processor is configured to perform the same-PCT satellite switch during a time period associated with the resynchronization.

3. The WTRU of claim 1, wherein the processor is configured to start the resynchronization based on the indication of the start time and the indication of the end time for the same-PCI satellite switch.

4. The WTRU of claim 1, wherein the processor is configured to perform one or more resynchronization procedures in response to the same-PCI satellite switch.

5. The WTRU of claim 4, wherein the one or more resynchronization procedures comprise a timing advance calculation, a doppler compensation, a power control procedure, or a measurement procedure.

6. The WTRU of claim 1, wherein the processor is configured to:

transmit assistance information that comprises a resynchronization duration, an indication that the WTRU can perform a synchronization procedure prior to the same-PCI satellite switch, and an indication of a time that the WTRU can resume communication with the second satellite after the same-PCI satellite switch.

7. The WTRU of claim 1, wherein the processor is configured to receive a configuration for the resynchronization that comprises a condition to declare resynchronization failure or resources to indicate successful resynchronization to the second satellite.

8. The WTRU of claim 1, wherein the processor is configured to transmit a resynchronization successful indication in response to successful resynchronization to the second satellite.

9. A method performed by a wireless transmit/receive unit (WTRU), the method comprising:

receiving, via broadcast signaling, configuration information indicating a same-physical cell identity (PCI) satellite switch from a first satellite to a second satellite, wherein the configuration information comprises an indication of a start time and an indication of an end time for the same-PCI satellite switch from the first satellite to the second satellite;

starting a resynchronization for the same-PCI satellite switch based on the configuration information;

suspend uplink transmission with the first satellite in response to the same-PCI satellite switch; and performing the same-PCI satellite switch to the second satellite based on the configuration information indicating the same-PCI satellite switch.

10. The method of claim 9, wherein the same-PCT satellite switch is performed during a time period associated with the resynchronization.

11. The method of claim 9, wherein the resynchronization is started based on the indication of the start time and the indication of the end time for the same-PCI satellite switch.

12. The method of claim 9, further comprising:

performing one or more resynchronization procedures in response to the same-PCI satellite switch.

13. The method of claim 12, wherein the one or more resynchronization procedures comprise a timing advance calculation, a doppler compensation, a power control procedure, or a measurement procedure.

14. The method of claim 9, further comprising:

transmitting assistance information that comprises a resynchronization duration, an indication that the WTRU can perform a synchronization procedure prior to the same-PCI satellite switch, and an indication of a time that the WTRU can resume communication with the second satellite after the same-PCI satellite switch.

15. The method of claim 9, further comprising:

receiving a configuration for resynchronization that comprises a condition to declare resynchronization failure or resources to indicate successful resynchronization to the second satellite.

16. The method of claim 9, further comprising:

transmitting a resynchronization successful indication in response to successful resynchronization to the second satellite.

* * * * *